United States Patent
Nguyen et al.

(10) Patent No.: US 11,459,757 B2
(45) Date of Patent: Oct. 4, 2022

(54) WATERSHEDDING FEATURES FOR ROOFING SHINGLES

(71) Applicant: GAF Energy LLC, Parsippany, NJ (US)

(72) Inventors: Thierry Nguyen, San Francisco, CA (US); Evan Michael Wray, Cotati, CA (US); Toby Tonascia, San Francisco, CA (US); Michael David Kuiper, Newark, CA (US); Jonathan Hewlett, San Francisco, CA (US); Brian West, San Francisco, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 17/579,152

(22) Filed: Jan. 19, 2022

(65) Prior Publication Data
US 2022/0228370 A1 Jul. 21, 2022

Related U.S. Application Data

(60) Provisional application No. 63/139,005, filed on Jan. 19, 2021.

(51) Int. Cl.
*E04D 1/02* (2006.01)
*E04D 1/00* (2006.01)
(Continued)

(52) U.S. Cl.
CPC .................. *E04D 1/02* (2013.01); *E04D 1/26* (2013.01); *E04D 1/29* (2019.08); *E04D 1/30* (2013.01);
(Continued)

(58) Field of Classification Search
CPC .... E04D 1/02; E04D 1/20; E04D 1/26; E04D 1/29; E04D 1/30; E04D 2001/308; H02S 20/25
See application file for complete search history.

(56) References Cited

U.S. PATENT DOCUMENTS

| | | |
|---|---|---|
| 1,981,467 A | 11/1934 | Radtke |
| 3,156,497 A | 11/1964 | Lessard |

(Continued)

FOREIGN PATENT DOCUMENTS

| | | |
|---|---|---|
| CA | 2829440 A1 | 4/2014 |
| CH | 700095 A2 | 6/2010 |

(Continued)

OTHER PUBLICATIONS

"Types of Roofing Underlayment", Owens Corning Roofing; <<https://www.owenscorning.com/en-us/roofing/tools/how-roofing-underlayment-helps-protect-your-home>> retrieved Nov. 1, 2021.
(Continued)

*Primary Examiner* — James M Ference
(74) *Attorney, Agent, or Firm* — Greenberg Traurig, LLP

(57) ABSTRACT

A system includes a plurality of roofing shingles installed on a roof deck. Each of the roofing shingles includes first and second ends, first and second edges, a head lap, a reveal portion, a first side lap at the first end, and a second side lap at the second end. The second side lap includes a first surface, which has an adhesive. The first side lap of a first one of the roofing shingles overlays and is attached to the second side lap of a second one of the roofing shingles to form a sealed portion between the head lap of the first one of the roofing shingles and the head lap of the second one of the roofing shingles.

20 Claims, 12 Drawing Sheets

(51) Int. Cl.
  *E04D 1/30* (2006.01)
  *H02S 20/25* (2014.01)
  *E04D 1/26* (2006.01)
  *E04D 1/20* (2006.01)

(52) U.S. Cl.
  CPC .............. *H02S 20/25* (2014.12); *E04D 1/20* (2013.01); *E04D 2001/308* (2013.01)

(56) References Cited

U.S. PATENT DOCUMENTS

| | | | |
|---|---|---|---|
| 4,258,948 A | 3/1981 | Hoffmann | |
| 4,349,220 A | 9/1982 | Carroll et al. | |
| 4,499,702 A | 2/1985 | Turner | |
| 4,636,577 A | 1/1987 | Peterpaul | |
| 5,167,579 A | 12/1992 | Rotter | |
| 5,575,861 A * | 11/1996 | Younan | H02S 20/25 52/173.3 |
| 5,590,495 A | 1/1997 | Bressler et al. | |
| 5,642,596 A | 7/1997 | Waddington | |
| 6,008,450 A | 12/1999 | Ohtsuka et al. | |
| 6,046,399 A | 4/2000 | Kapner | |
| 6,320,114 B1 | 11/2001 | Kuechler | |
| 6,336,304 B1 | 1/2002 | Mimura et al. | |
| 6,341,454 B1 | 1/2002 | Koleoglou | |
| 6,407,329 B1 | 6/2002 | Iino et al. | |
| 6,576,830 B2 | 6/2003 | Nagao et al. | |
| 6,928,781 B2 | 8/2005 | Desbois et al. | |
| 6,936,329 B2 * | 8/2005 | Kiik | C03C 17/38 442/68 |
| 6,972,367 B2 | 12/2005 | Federspiel et al. | |
| 7,138,578 B2 | 11/2006 | Komamine | |
| 7,155,870 B2 | 1/2007 | Almy | |
| 7,178,295 B2 | 2/2007 | Dinwoodie | |
| 7,487,771 B1 | 2/2009 | Eiffert et al. | |
| 7,587,864 B2 | 9/2009 | McCaskill et al. | |
| 7,678,990 B2 | 3/2010 | McCaskill et al. | |
| 7,678,991 B2 | 3/2010 | McCaskill et al. | |
| 7,748,191 B2 | 7/2010 | Podirsky | |
| 7,819,114 B2 | 10/2010 | Augenbraun et al. | |
| 7,824,191 B1 | 11/2010 | Browder | |
| 7,832,176 B2 | 11/2010 | McCaskill et al. | |
| 8,118,109 B1 | 2/2012 | Hacker | |
| 8,168,880 B2 | 5/2012 | Jacobs et al. | |
| 8,173,889 B2 | 5/2012 | Kalkanoglu et al. | |
| 8,210,570 B1 | 7/2012 | Railkar et al. | |
| 8,276,329 B2 | 10/2012 | Lenox | |
| 8,312,693 B2 | 11/2012 | Cappelli | |
| 8,319,093 B2 | 11/2012 | Kalkanoglu et al. | |
| 8,333,040 B2 | 12/2012 | Shiao et al. | |
| 8,371,076 B2 | 2/2013 | Jones et al. | |
| 8,375,653 B2 | 2/2013 | Shiao et al. | |
| 8,404,967 B2 | 3/2013 | Kalkanoglu et al. | |
| 8,410,349 B2 | 4/2013 | Kalkanoglu et al. | |
| 8,418,415 B2 | 4/2013 | Shiao et al. | |
| 8,438,796 B2 | 5/2013 | Shiao et al. | |
| 8,468,754 B2 | 6/2013 | Railkar et al. | |
| 8,468,757 B2 | 6/2013 | Krause et al. | |
| 8,505,249 B2 | 8/2013 | Geary | |
| 8,512,866 B2 | 8/2013 | Taylor | |
| 8,513,517 B2 | 8/2013 | Kalkanoglu et al. | |
| 8,586,856 B2 | 11/2013 | Kalkanoglu et al. | |
| 8,629,578 B2 | 1/2014 | Kurs et al. | |
| 8,656,657 B2 | 2/2014 | Livsey et al. | |
| 8,671,630 B2 | 3/2014 | Lena et al. | |
| 8,695,289 B2 | 4/2014 | Koch et al. | |
| 8,713,858 B1 | 5/2014 | Xie | |
| 8,713,860 B2 | 5/2014 | Railkar et al. | |
| 8,733,038 B2 | 5/2014 | Kalkanoglu et al. | |
| 8,789,321 B2 | 7/2014 | Ishida | |
| 8,793,940 B2 | 8/2014 | Kalkanoglu et al. | |
| 8,793,941 B2 | 8/2014 | Bosler et al. | |
| 8,826,607 B2 | 9/2014 | Shiao et al. | |
| 8,835,751 B2 | 9/2014 | Kalkanoglu et al. | |
| 8,898,963 B1 * | 12/2014 | Amatruda | E04D 1/2963 52/409 |
| 8,925,262 B2 | 1/2015 | Railkar et al. | |
| 8,925,272 B1 * | 1/2015 | Amatruda | E04D 1/2963 52/557 |
| 8,943,766 B2 | 2/2015 | Gombarick et al. | |
| 8,946,544 B2 | 2/2015 | Jacobs et al. | |
| 8,950,128 B2 | 2/2015 | Kalkanoglu et al. | |
| 8,959,848 B2 | 2/2015 | Jenkins et al. | |
| 8,966,838 B2 | 3/2015 | Jenkins | |
| 8,994,224 B2 | 3/2015 | Mehta et al. | |
| 9,032,672 B2 | 5/2015 | Livsey et al. | |
| 9,166,087 B2 | 10/2015 | Chihlas et al. | |
| 9,169,646 B2 | 10/2015 | Rodrigues et al. | |
| 9,170,034 B2 | 10/2015 | Bosler et al. | |
| 9,171,991 B2 | 10/2015 | Pearce | |
| 9,178,465 B2 | 11/2015 | Shiao et al. | |
| 9,202,955 B2 | 12/2015 | Livsey et al. | |
| 9,212,832 B2 | 12/2015 | Jenkins | |
| 9,217,584 B2 | 12/2015 | Kalkanoglu et al. | |
| 9,279,221 B1 | 2/2016 | Zhao | |
| 9,273,885 B2 | 3/2016 | Rodrigues et al. | |
| 9,276,141 B2 | 3/2016 | Kalkanoglu et al. | |
| 9,331,224 B2 | 5/2016 | Koch et al. | |
| 9,356,174 B2 | 5/2016 | Durate et al. | |
| 9,359,014 B1 | 6/2016 | Yang et al. | |
| 9,528,270 B2 | 12/2016 | Jenkins et al. | |
| 9,605,432 B1 | 3/2017 | Robbins | |
| 9,711,672 B2 | 7/2017 | Wang | |
| 9,755,573 B2 | 9/2017 | Livsey et al. | |
| 9,786,802 B2 | 10/2017 | Shiao et al. | |
| 9,808,947 B2 * | 11/2017 | Grubka | B26D 3/10 |
| 9,831,818 B2 | 11/2017 | West | |
| 9,912,284 B2 | 3/2018 | Svec | |
| 9,923,515 B2 | 3/2018 | Rodrigues et al. | |
| 9,938,729 B2 | 4/2018 | Coon | |
| 9,991,412 B2 | 6/2018 | Gonzalez et al. | |
| 9,998,067 B2 | 6/2018 | Kalkanoglu et al. | |
| 10,027,273 B2 | 7/2018 | West et al. | |
| 10,041,253 B2 * | 8/2018 | Folkersen | E04D 5/00 |
| 10,059,016 B2 * | 8/2018 | Grubka | B26D 3/10 |
| 10,115,850 B2 | 10/2018 | Rodrigues et al. | |
| 10,128,660 B1 | 11/2018 | Apte et al. | |
| 10,187,005 B2 | 1/2019 | Rodrigues et al. | |
| 10,256,765 B2 | 4/2019 | Rodrigues et al. | |
| 10,454,408 B2 | 10/2019 | Livsey et al. | |
| 10,480,192 B2 * | 11/2019 | Xing | E04D 5/10 |
| 10,530,292 B1 | 1/2020 | Cropper et al. | |
| 10,560,048 B2 | 2/2020 | Fisher et al. | |
| 10,563,406 B2 | 2/2020 | Kalkanoglu et al. | |
| D879,031 S | 3/2020 | Lance et al. | |
| 10,584,493 B2 * | 3/2020 | Jenkins | E04D 1/12 |
| 10,778,139 B2 * | 9/2020 | Almy | H01L 31/048 |
| 10,784,813 B2 | 9/2020 | Kalkanoglu et al. | |
| D904,289 S | 12/2020 | Lance et al. | |
| 11,012,026 B2 | 5/2021 | Kalkanoglu et al. | |
| 11,177,639 B1 | 11/2021 | Nguyen et al. | |
| 11,217,715 B2 | 1/2022 | Sharenko et al. | |
| 11,251,744 B1 | 2/2022 | Bunea et al. | |
| 11,258,399 B2 | 2/2022 | Kalkanoglu et al. | |
| 11,283,394 B2 | 3/2022 | Perkins et al. | |
| 2002/0053360 A1 | 5/2002 | Kinoshita et al. | |
| 2002/0129849 A1 | 9/2002 | Heckeroth | |
| 2003/0101662 A1 | 6/2003 | Ullman | |
| 2003/0132265 A1 | 7/2003 | Villela et al. | |
| 2003/0217768 A1 | 11/2003 | Guha | |
| 2004/0055240 A1 * | 3/2004 | Kiik | E04D 1/28 52/545 |
| 2005/0005534 A1 * | 1/2005 | Nomura | H02S 20/23 52/90.2 |
| 2005/0115603 A1 | 6/2005 | Yoshida et al. | |
| 2005/0144870 A1 | 7/2005 | Dinwoodie | |
| 2006/0000178 A1 * | 1/2006 | Almy | H02S 20/23 52/543 |
| 2006/0042683 A1 | 3/2006 | Gangemi | |
| 2007/0157963 A1 * | 7/2007 | Metten | F24S 25/632 136/251 |
| 2007/0181174 A1 | 8/2007 | Ressler | |
| 2007/0193618 A1 | 8/2007 | Bressler et al. | |

(56) References Cited

U.S. PATENT DOCUMENTS

| | | |
|---|---|---|
| 2008/0006323 A1 | 1/2008 | Kalkanoglu et al. |
| 2008/0035140 A1 | 2/2008 | Placer et al. |
| 2008/0315061 A1 | 2/2008 | Placer et al. |
| 2008/0271774 A1 | 11/2008 | Kalkanoglu et al. |
| 2009/0000222 A1 | 1/2009 | Kalkanoglu et al. |
| 2009/0019795 A1 | 1/2009 | Szacsvay et al. |
| 2009/0044850 A1 | 2/2009 | Kimberly |
| 2009/0114261 A1 | 5/2009 | Stancel et al. |
| 2009/0133340 A1 | 5/2009 | Shiao et al. |
| 2009/0159118 A1 | 6/2009 | Kalkanoglu |
| 2009/0178350 A1 | 7/2009 | Kalkanoglu et al. |
| 2009/0229652 A1 | 9/2009 | Mapel et al. |
| 2010/0101634 A1 | 4/2010 | Frank et al. |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0313499 A1 | 12/2010 | Gangemi |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1 | 3/2011 | Livsey et al. |
| 2011/0058337 A1 | 3/2011 | Han |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0239555 A1 | 10/2011 | Cook et al. |
| 2011/0302859 A1 | 12/2011 | Crasnianski |
| 2012/0060902 A1 | 3/2012 | Drake |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins |
| 2012/0240490 A1 | 9/2012 | Gangemi |
| 2012/0260977 A1 | 10/2012 | Stancel |
| 2012/0266942 A1 | 10/2012 | Komatsu et al. |
| 2012/0279150 A1 | 11/2012 | Pislkak et al. |
| 2013/0008499 A1 | 1/2013 | Verger et al. |
| 2013/0014455 A1 | 1/2013 | Grieco |
| 2013/0193769 A1 | 8/2013 | Mehta et al. |
| 2013/0247988 A1 | 9/2013 | Reese et al. |
| 2013/0284267 A1 | 10/2013 | Plug et al. |
| 2013/0306137 A1 | 11/2013 | Ko |
| 2014/0090697 A1 | 4/2014 | Rodrigues et al. |
| 2014/0150843 A1* | 6/2014 | Pearce ............... H01L 31/0203 136/244 |
| 2014/0173997 A1 | 6/2014 | Jenkins |
| 2014/0179220 A1 | 6/2014 | Railkar et al. |
| 2014/0254776 A1 | 9/2014 | O'Connor et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0089895 A1* | 4/2015 | Leitch ............... E04D 1/28 52/518 |
| 2015/0340516 A1 | 11/2015 | Kim et al. |
| 2015/0349173 A1 | 12/2015 | Morad et al. |
| 2016/0105144 A1 | 4/2016 | Haynes et al. |
| 2016/0186436 A1* | 6/2016 | Grubka ............... E04D 1/26 52/526 |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0126171 A1* | 5/2017 | Fisher ............... H02S 20/25 |
| 2017/0159292 A1 | 6/2017 | Chihlas et al. |
| 2017/0179726 A1 | 6/2017 | Garrity et al. |
| 2017/0248344 A1* | 8/2017 | Kauffmann ............ F24S 25/40 |
| 2017/0331415 A1 | 11/2017 | Koppi et al. |
| 2018/0094438 A1 | 4/2018 | Wu et al. |
| 2018/0097472 A1 | 4/2018 | Anderson et al. |
| 2018/0313088 A1* | 11/2018 | Folkersen ............ E04D 5/00 |
| 2018/0351502 A1 | 12/2018 | Almy et al. |
| 2019/0030867 A1 | 1/2019 | Sun et al. |
| 2019/0058436 A1* | 2/2019 | Atchley ............... H02S 30/10 |
| 2019/0081436 A1 | 3/2019 | Onodi et al. |
| 2019/0089293 A1* | 3/2019 | Almy ............... H01L 31/0504 |
| 2019/0093344 A1* | 3/2019 | Benensky ............ B32B 3/26 |
| 2019/0123679 A1* | 4/2019 | Rodrigues ........... H02S 40/36 |
| 2019/0301160 A1* | 10/2019 | Nash ............... E04D 1/26 |
| 2019/0305717 A1 | 10/2019 | Allen et al. |
| 2020/0020819 A1 | 1/2020 | Farhangi |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0044250 A1* | 2/2021 | Liu ............... H01L 31/03682 |
| 2021/0115223 A1 | 4/2021 | Bonekamp et al. |
| 2021/0159353 A1 | 5/2021 | Li et al. |

FOREIGN PATENT DOCUMENTS

| | | |
|---|---|---|
| CN | 202797032 U | 3/2013 |
| DE | 1958248 A1 | 11/1971 |
| EP | 1837162 A1 | 9/2007 |
| EP | 1774372 A1 | 7/2011 |
| EP | 2784241 A1 | 10/2014 |
| JP | 2001-098703 A | 4/2001 |
| JP | 2017-027735 A | 2/2017 |
| WO | 2011/049944 A1 | 4/2011 |
| WO | 2015/133632 A | 9/2015 |
| WO | 2019/201416 A1 | 10/2019 |

OTHER PUBLICATIONS

Sunflare, Procducts: "Sunflare Develops Prototype For New Residential Solar Shingles"; 2019 <<sunflaresolar.com/news/sunflare-develops-prototype-for-new-residential-solar-shingles>> retrieved Feb. 2, 2021.

RGS Energy, 3.5kW POWERHOUSE 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

* cited by examiner

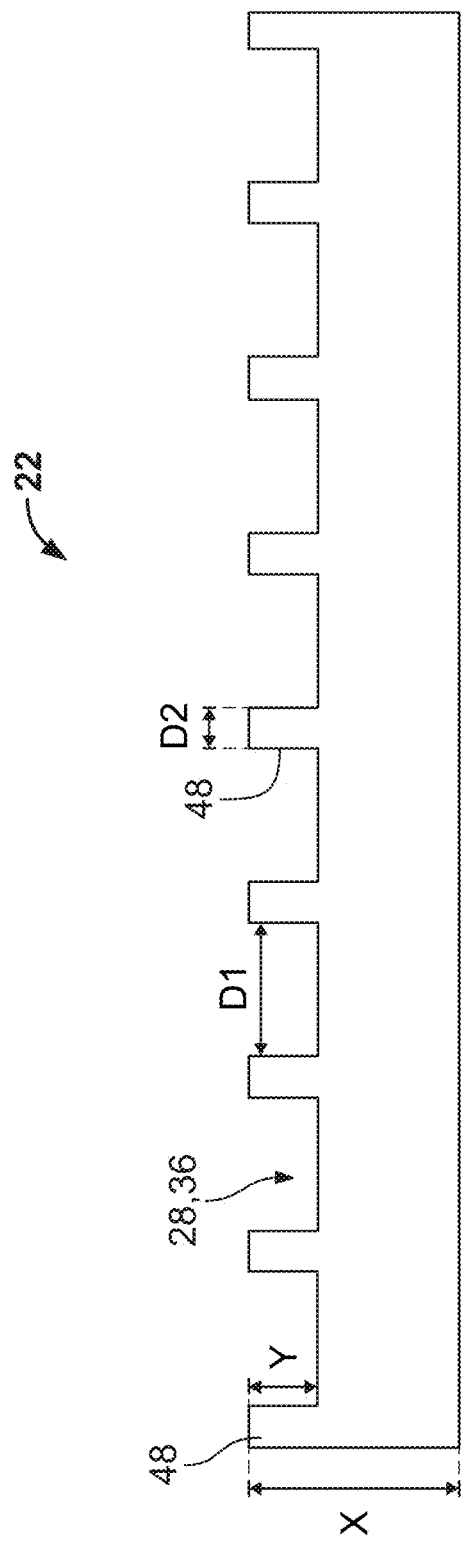

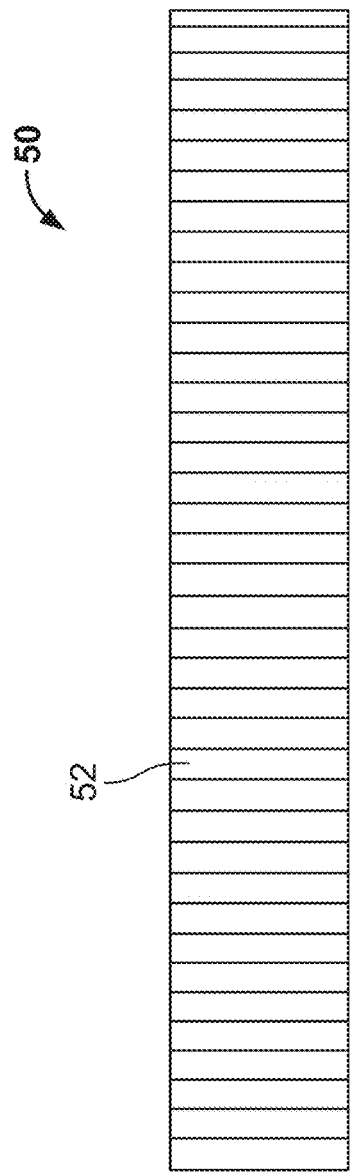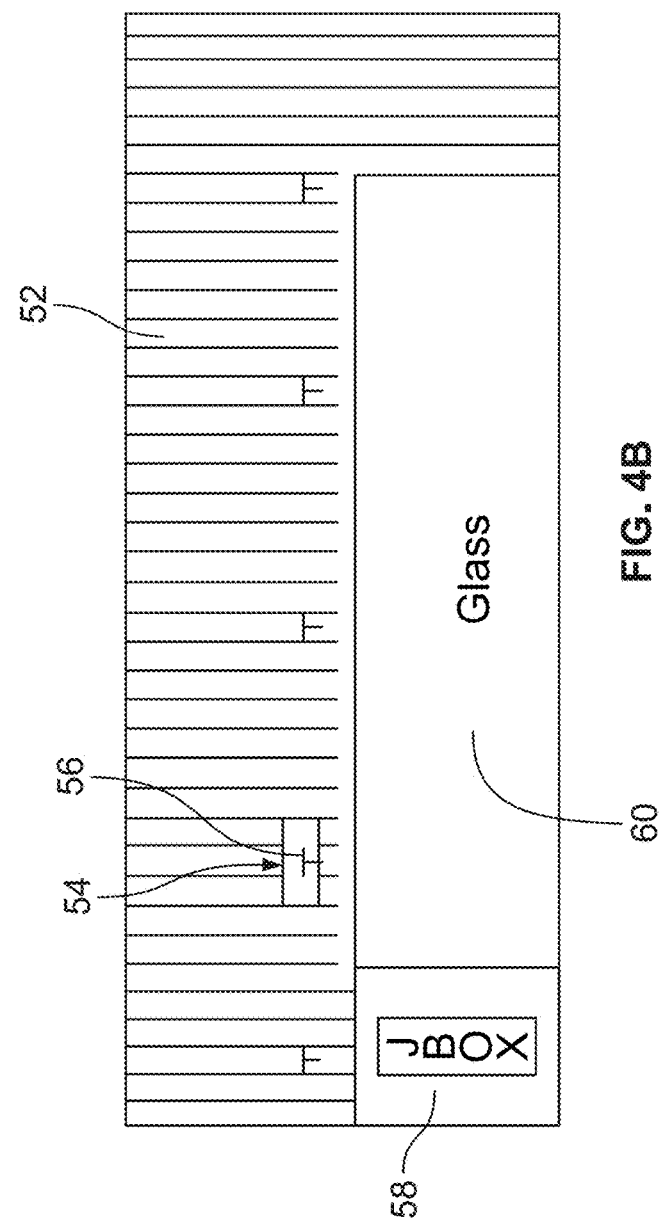

WATERSHEDDING FEATURES FOR ROOFING SHINGLES

CROSS-REFERENCE TO RELATED APPLICATION

This application is a Section 111(a) application relating to and claiming the benefit of commonly-owned, U.S. Provisional Patent Application Ser. No. 63/139,005, filed Jan. 19, 2021, entitled "WATERSHEDDING FEATURES FOR ROOFING SHINGLES," the contents of which are incorporated herein by reference in its entirety.

FIELD OF THE INVENTION

The present invention relates to roofing shingles and, more particularly, roofing shingles and photovoltaic shingles having watershedding features.

BACKGROUND OF THE INVENTION

Photovoltaic systems having solar panels are commonly installed on roofing of structures. What is needed is a photovoltaic system having features for efficient installation thereof and water shedding.

SUMMARY OF THE INVENTION

In some embodiments, a system includes a plurality of roofing shingles installed on a roof deck, wherein each of the roofing shingles includes a first end, a second end opposite the first end, a first edge extending from the first end to the second end, and a second edge opposite the first edge and extending from the first end to the second end, a head lap extending from a first location intermediate the first end and the second end to a second location intermediate the first end and the second end and extending from the first edge to a third location intermediate the first edge and the second edge, a reveal portion extending from the first location to the second location and from the second edge to the third location, a first side lap at the first end, and a second side lap at the second end, wherein the second side lap includes a first surface, wherein the first surface includes an adhesive, and wherein the first side lap of a first one of the roofing shingles overlays and is attached to the second side lap of a second one of the roofing shingles to form a sealed portion between the head lap of the first one of the roofing shingles and the head lap of the second one of the roofing shingles.

In some embodiments, the adhesive includes caulking. In some embodiments, the adhesive includes at least one adhesive strip. In some embodiments, the at least one adhesive strip is an adhesive tape. In some embodiments, the adhesive tape is butyl tape. In some embodiments, the at least one adhesive strip is a peel and stick film sheet. In some embodiments, the reveal portion includes at least one solar cell. In some embodiments, the head lap includes a plurality of grooves, each of which extends from a first end thereof, located proximate to the first edge and intermediate the first end of the roofing shingle and the second end of the roofing shingle, to a second end thereof, located proximate to the first location, and wherein the head lap of the first one of the roofing shingles and the head lap of the second one of the roofing shingles form a seam therebetween, and wherein a longitudinal axis of each of the plurality of grooves does not intersect the seam. In some embodiments, the reveal portion includes a first width and each of the plurality of grooves includes a second width, and wherein the second width is 10% to 100% of the first width.

In some embodiments, the head lap includes a thickness, wherein each of the plurality of grooves includes a depth, and wherein the depth is 10% to 99% of the thickness of the head lap. In some embodiments, each of the plurality of grooves extends 0 degrees to 45 degrees relative to the seam. In some embodiments, the second side lap includes a first end and a second end opposite the first end of the second side lap, a first edge extending from the first end of the second side lap to the second end of the second side lap, a second edge opposite the first edge of the second side lap and extending from the first end of the second side lap to the second end of the second side lap, and a plurality of grooves, and wherein the head lap of the first one of the roofing shingles and the head lap of the second one of the roofing shingles form a seam therebetween, and wherein a longitudinal axis of each of the plurality of grooves does not intersect the seam. In some embodiments, each of the plurality of grooves extends 0 degrees to 45 degrees relative to the seam.

In some embodiments, a method includes obtaining a plurality of roofing shingles, each of the roofing shingles includes a first end, a second end opposite the first end, a first edge extending from the first end to the second end, and a second edge opposite the first edge and extending from the first end to the second end, a head lap extending from a first location intermediate the first end and the second end to a second location intermediate the first end and the second end and extending from the first edge to a third location intermediate the first edge and the second edge, a reveal portion extending from the first location to the second location and from the second edge to the third location, a first side lap at the first end, and a second side lap at the second end, wherein the second side lap includes a first surface and an adhesive on the first surface; installing a first one of the plurality of roofing shingles on a roof deck; and installing a second one of the plurality of roofing shingles on the roof deck, wherein the first side lap of the second one of the roofing shingles overlays and is attached to the second side lap of the first one of the plurality of roofing shingles to form a sealed portion between the head lap of the first one of the roofing shingles and the head lap of the second one of the roofing shingles.

In some embodiments, the adhesive includes caulking. In some embodiments, the adhesive includes at least one adhesive strip. In some embodiments, the at least one adhesive strip is an adhesive tape. In some embodiments, the adhesive tape is butyl tape. In some embodiments, the at least one adhesive strip is a peel and stick film sheet. In some embodiments, the reveal portion includes at least one solar cell.

BRIEF DESCRIPTION OF THE DRAWINGS

FIG. 3 is a side, cross-sectional view of a side lap employed by one of the photovoltaic shingles of FIG. 2;

FIGS. 4A and 4B is a top plan view of an embodiment of a groove pattern of a photovoltaic shingle;

DETAILED DESCRIPTION

Figure 1:
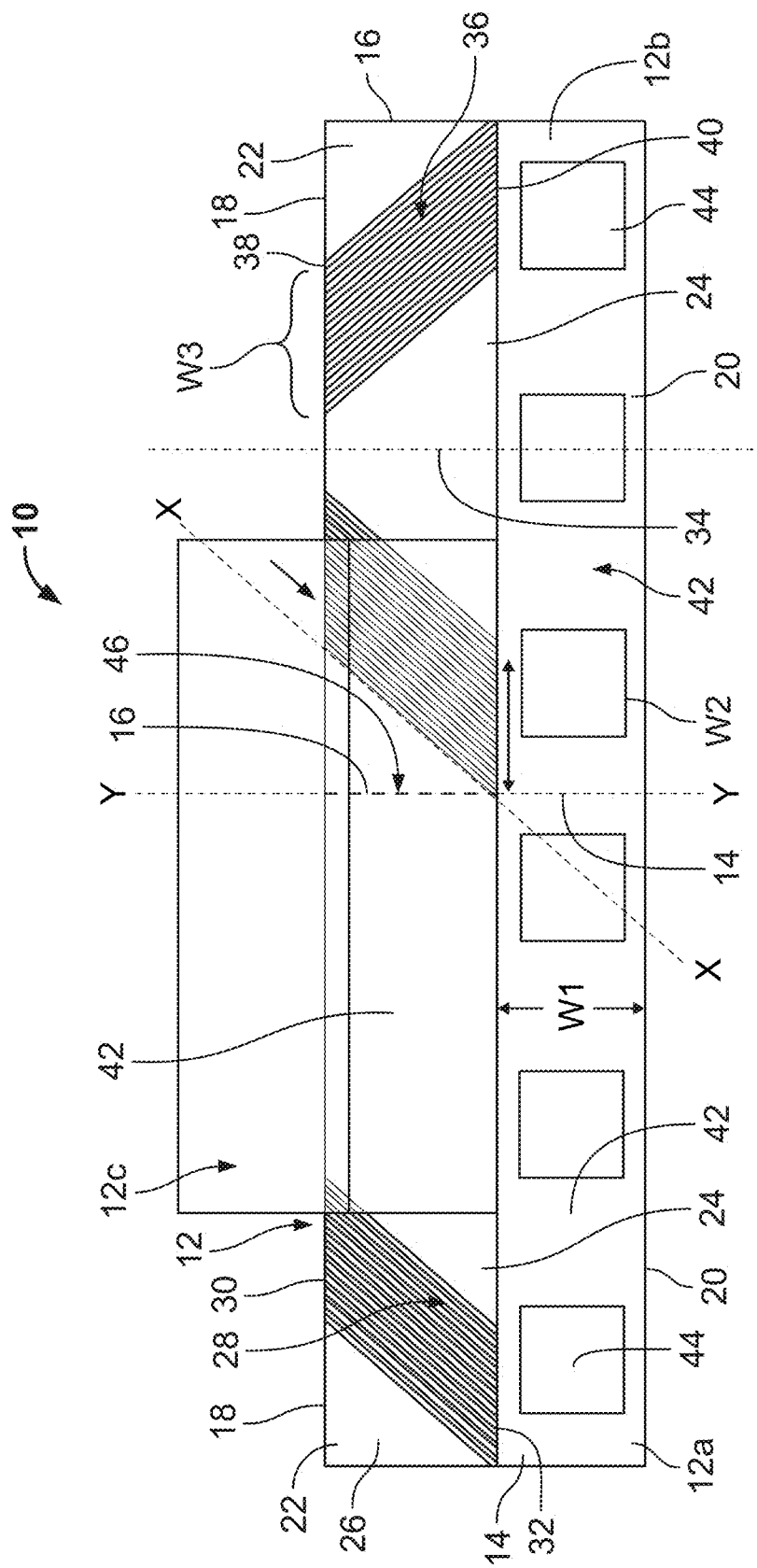
FIG. 1 is a top plan view of an embodiment of a system including a plurality of photovoltaic shingles.
Figure 2:
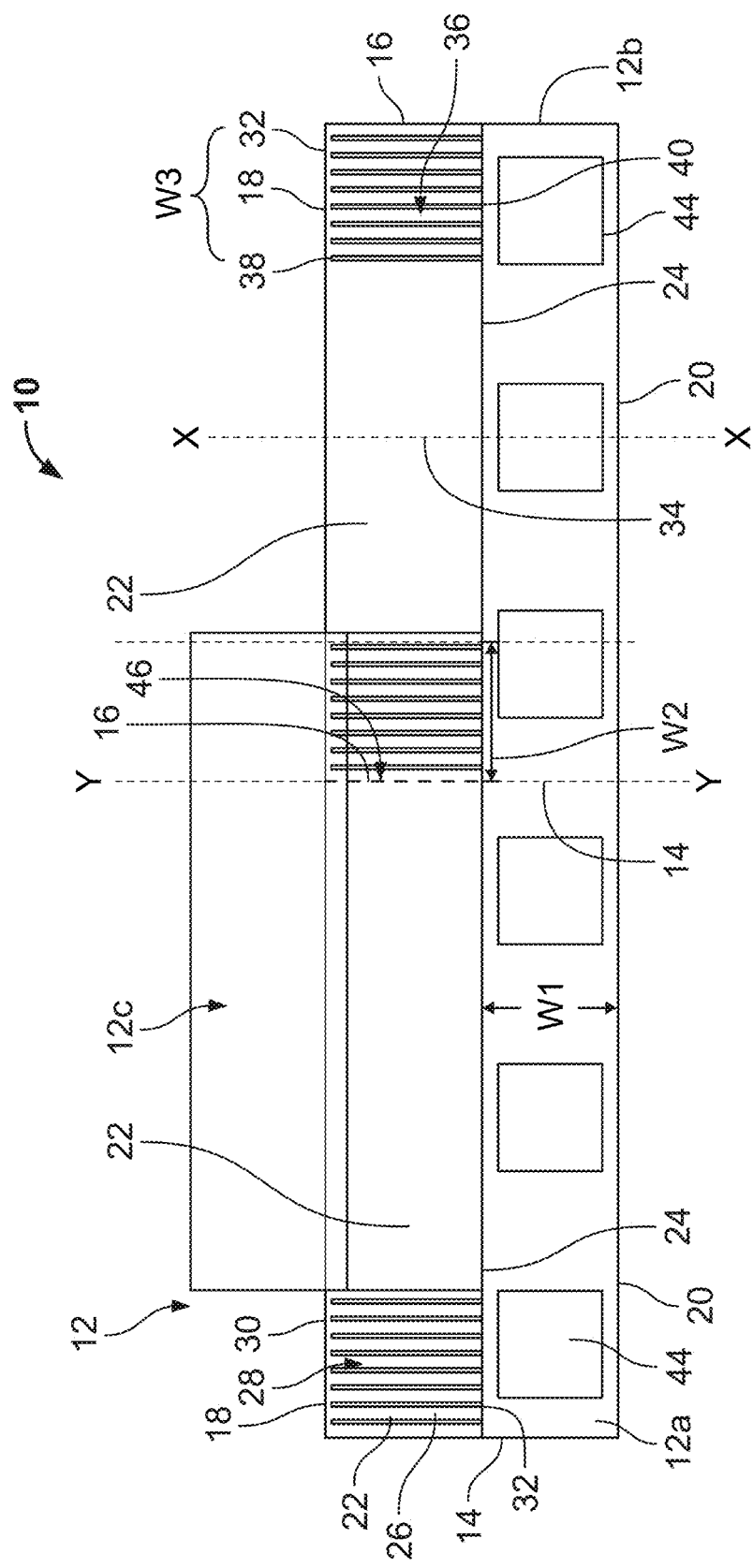
FIG. 2 is a top plan view of another embodiment of a system including a plurality of photovoltaic shingles.

Referring to FIGS. 1 and 2, in some embodiments, a system 10 includes a plurality of roofing shingles 12. In some embodiments, the plurality of roofing shingles includes a first photovoltaic shingle 12a and a second photovoltaic shingle 12b. In some embodiments, each of the plurality of roofing shingles 12 includes a first end 14, a second end 16 opposite the first end 14, a first edge 18 extending from the first end 14 to the second end 16, and a second edge 20 opposite the first edge 18 and extending from the first end 14 to the second end 16. In some embodiments, each of the plurality of roofing shingles 12 includes a head lap 22 extending from the first end 14 to the second end 16 and from the first edge 18 to a first location 24 intermediate the first edge 18 and the second edge 20.

In some embodiments, the head lap 22 includes a surface 26 having at least one first groove 28. In some embodiments, the head lap 22 includes a plurality of the first grooves 28. In some embodiments, each of the at least one first groove 28 extends from a first end 30 thereof, located proximate to the first edge 18 and intermediate the first end 14 and the second end 16, a second end 32, located proximate to the first location 24. In some embodiments, the second end 32 of the at least one first groove 28 is located proximate to the first end 14. In another embodiment, the second end 32 of the at least one first groove 28 is located intermediate the first end 14 and a second location 34 that is approximately midway between the first end 14 and the second end 16.

In another embodiment, the head lap 22 includes at least one second groove 36. In some embodiments, the at least one second groove 36 includes a plurality of the second grooves 36. In some embodiments, each of the at least one second groove 36 extends from a first end 38 thereof, located proximate to the first edge 18 and intermediate the first end 14 and the second end 16, and a second end 40, located proximate to the first location 24. In some embodiments, the second end 40 of the at least one second groove 36 is located proximate to the second end 16. In another embodiment, the second end 40 of the at least one second groove 36 is located intermediate the second end 16 and the second location 34.

In some embodiments, each of the roofing shingles 12 includes a reveal portion 42 extending from the first end 14 to the second end 16 and from the second edge 20 to the first location 24. In some embodiments, the reveal portion 42 is located adjacent to the head lap 22. In some embodiments, the reveal portion 42 includes at least one solar cell 44. In some embodiments, the at least one solar cell 44 includes a plurality of the solar cells 44. In some embodiments, the reveal portion 42 includes a first layer and a second layer overlaying the first layer. In some embodiments, the second layer includes the at least one solar cell. In some embodiments, the first layer and the second layer are laminated. In some embodiments, the second layer is ultrasonically welded to the first layer. In some embodiments, the second layer is heat welded to the first layer. In some embodiments, the second layer is thermally bonded to the first layer.

In some embodiments, the reveal portion 42 includes a width W1. In some embodiments, the at least one first groove 28 includes a total width W2 (i.e., the width extending from the first outer at least one first groove 28 to the last outer at least one first groove 28). In some embodiments, the total width W2 of the at least one first groove 28 is 10% to 100% of the width W1 of the reveal portion 42. In some embodiments, the total width W2 of the at least one first groove 28 is 10% to 90% of the width W1 of the reveal portion 42. In some embodiments, the total width W2 of the at least one first groove 28 is 10% to 80% of the width W1 of the reveal portion 42. In some embodiments, the total width W2 of the at least one first groove 28 is 10% to 70% of the width W1 of the reveal portion 42. In some embodiments, the total width W2 of the at least one first groove 28 is 10% to 60% of the width W1 of the reveal portion 42. In some embodiments, the total width W2 of the at least one first groove 28 is 10% to 50% of the width W1 of the reveal portion 42. In some embodiments, the total width W2 of the at least one first groove 28 is 10% to 40% of the width W1 of the reveal portion 42. In some embodiments, the total width W2 of the at least one first groove 28 is 10% to 30% of the width W1 of the reveal portion 42. In some embodiments, the total width W2 of the at least one first groove 28 is 10% to 20% of the width W1 of the reveal portion 42.

In some embodiments, the total width W2 of the at least one first groove 28 is 20% to 100% of the width W1 of the reveal portion 42. In some embodiments, the total width W2 of the at least one first groove 28 is 20% to 90% of the width W1 of the reveal portion 42. In some embodiments, the total width W2 of the at least one first groove 28 is 20% to 80% of the width W1 of the reveal portion 42. In some embodiments, the total width W2 of the at least one first groove 28 is 20% to 70% of the width W1 of the reveal portion 42. In some embodiments, the total width W2 of the at least one first groove 28 is 20% to 60% of the width W1 of the reveal portion 42. In some embodiments, the total width W2 of the at least one first groove 28 is 20% to 50% of the width W1 of the reveal portion 42. In some embodiments, the total width W2 of the at least one first groove 28 is 20% to 40% of the width W1 of the reveal portion 42. In some embodiments, the total width W2 of the at least one first groove 28 is 20% to 30% of the width W1 of the reveal portion 42.

In some embodiments, the total width W2 of the at least one first groove 28 is 30% to 100% of the width W1 of the reveal portion 42. In some embodiments, the total width W2 of the at least one first groove 28 is 30% to 90% of the width W1 of the reveal portion 42. In some embodiments, the total width W2 of the at least one first groove 28 is 30% to 80% of the width W1 of the reveal portion 42. In some embodiments, the total width W2 of the at least one first groove 28 is 30% to 70% of the width W1 of the reveal portion 42. In some embodiments, the total width W2 of the at least one first groove 28 is 30% to 60% of the width W1 of the reveal portion 42. In some embodiments, the total width W2 of the at least one first groove 28 is 30% to 50% of the width W1 of the reveal portion 42. In some embodiments, the total width W2 of the at least one first groove 28 is 30% to 40% of the width W1 of the reveal portion 42.

In some embodiments, the total width W2 of the at least one first groove 28 is 40% to 100% of the width W1 of the reveal portion 42. In some embodiments, the total width W2 of the at least one first groove 28 is 40% to 90% of the width W1 of the reveal portion 42. In some embodiments, the total width W2 of the at least one first groove 28 is 40% to 80% of the width W1 of the reveal portion 42. In some embodiments, the total width W2 of the at least one first groove 28 is 40% to 70% of the width W1 of the reveal portion 42. In some embodiments, the total width W2 of the at least one first groove 28 is 40% to 60% of the width W1 of the reveal portion 42. In some embodiments, the total width W2 of the at least one first groove 28 is 40% to 50% of the width W1 of the reveal portion 42.

In some embodiments, the total width W2 of the at least one first groove 28 is 50% to 100% of the width W1 of the reveal portion 42. In some embodiments, the total width W2 of the at least one first groove 28 is 50% to 90% of the width W1 of the reveal portion 42. In some embodiments, the total width W2 of the at least one first groove 28 is 50% to 80% of the width W1 of the reveal portion 42. In some embodiments, the total width W2 of the at least one first groove 28 is 50% to 70% of the width W1 of the reveal portion 42. In some embodiments, the total width W2 of the at least one first groove 28 is 50% to 60% of the width W1 of the reveal portion 42.

In some embodiments, the total width W2 of the at least one first groove 28 is 60% to 100% of the width W1 of the reveal portion 42. In some embodiments, the total width W2 of the at least one first groove 28 is 60% to 90% of the width W1 of the reveal portion 42. In some embodiments, the total width W2 of the at least one first groove 28 is 60% to 80% of the width W1 of the reveal portion 42. In some embodiments, the total width W2 of the at least one first groove 28 is 60% to 70% of the width W1 of the reveal portion 42.

In some embodiments, the total width W2 of the at least one first groove 28 is 70% to 100% of the width W1 of the reveal portion 42. In some embodiments, the total width W2 of the at least one first groove 28 is 70% to 90% of the width W1 of the reveal portion 42. In some embodiments, the total width W2 of the at least one first groove 28 is 70% to 80% of the width W1 of the reveal portion 42. In some embodiments, the total width W2 of the at least one first groove 28 is 80% to 100% of the width W1 of the reveal portion 42. In some embodiments, the total width W2 of the at least one first groove 28 is 80% to 90% of the width W1 of the reveal portion 42. In some embodiments, the total width W2 of the at least one first groove 28 is 90% to 100% of the width W1 of the reveal portion 42.

In some embodiments, the at least one second groove 36 includes a total width W3 (i.e., the width extending from the first outer at least one second groove 36 to the last outer at least one second groove 36). In some embodiments, the total width W3 of the at least one second groove 36 is 10% to 100% of the width W1 of the reveal portion 42. In some embodiments, the same ranges provided above with respect to the total width W2 of the at least one first groove 28 is applicable to the total width W3 of the at least one second groove 36.

Referring to FIG. 3, in some embodiments, the head lap 22 of each of the roofing shingles 12 includes a thickness X of 0.1 mm to 5 mm. In another embodiment, the head lap 22 of each of the roofing shingles 12 includes a thickness X of 0.1 mm to 4.5 mm. In another embodiment, the head lap 22 of each of the roofing shingles 12 includes a thickness X of 0.1 mm to 4 mm. In another embodiment, the head lap 22 of each of the roofing shingles 12 includes a thickness X of 0.1 mm to 3.5 mm. In another embodiment, the head lap 22 of each of the roofing shingles 12 includes a thickness X of 0.1 mm to 3 mm. In another embodiment, the head lap 22 of each of the roofing shingles 12 includes a thickness X of 0.1 mm to 2.5 mm. In another embodiment, the head lap 22 of each of the roofing shingles 12 includes a thickness X of 0.1 mm to 2 mm. In another embodiment, the head lap 22 of each of the roofing shingles 12 includes a thickness X of 0.1 mm to 1.5 mm. In another embodiment, the head lap 22 of each of the roofing shingles 12 includes a thickness X of 0.1 mm to 1 mm. In another embodiment, the head lap 22 of each of the roofing shingles 12 includes a thickness X of 0.1 mm to 0.5 mm.

In some embodiments, the head lap 22 of each of the roofing shingles 12 includes a thickness X of 0.5 mm to 5 mm. In another embodiment, the head lap 22 of each of the roofing shingles 12 includes a thickness X of 0.5 mm to 4.5 mm. In another embodiment, the head lap 22 of each of the roofing shingles 12 includes a thickness X of 0.5 mm to 4 mm. In another embodiment, the head lap 22 of each of the roofing shingles 12 includes a thickness X of 0.5 mm to 3.5 mm. In another embodiment, the head lap 22 of each of the roofing shingles 12 includes a thickness X of 0.5 mm to 3 mm. In another embodiment, the head lap 22 of each of the roofing shingles 12 includes a thickness X of 0.5 mm to 2.5 mm. In another embodiment, the head lap 22 of each of the roofing shingles 12 includes a thickness X of 0.5 mm to 2 mm. In another embodiment, the head lap 22 of each of the roofing shingles 12 includes a thickness X of 0.5 mm to 1.5 mm. In another embodiment, the head lap 22 of each of the roofing shingles 12 includes a thickness X of 0.5 mm to 1 mm.

In some embodiments, the head lap 22 of each of the roofing shingles 12 includes a thickness X of 1 mm to 5 mm. In another embodiment, the head lap 22 of each of the roofing shingles 12 includes a thickness X of 1 mm to 4.5 mm. In another embodiment, the head lap 22 of each of the roofing shingles 12 includes a thickness X of 1 mm to 4 mm. In another embodiment, the head lap 22 of each of the roofing shingles 12 includes a thickness X of 1 mm to 3.5 mm. In another embodiment, the head lap 22 of each of the roofing shingles 12 includes a thickness X of 1 mm to 3 mm. In another embodiment, the head lap 22 of each of the roofing shingles 12 includes a thickness X of 1 mm to 2.5 mm. In another embodiment, the head lap 22 of each of the roofing shingles 12 includes a thickness X of 1 mm to 2 mm. In another embodiment, the head lap 22 of each of the roofing shingles 12 includes a thickness X of 1 mm to 1.5 mm.

In some embodiments, the head lap 22 of each of the roofing shingles 12 includes a thickness X of 1.5 mm to 5 mm. In another embodiment, the head lap 22 of each of the roofing shingles 12 includes a thickness X of 1.5 mm to 4.5 mm. In another embodiment, the head lap 22 of each of the roofing shingles 12 includes a thickness X of 1.5 mm to 4 mm. In another embodiment, the head lap 22 of each of the roofing shingles 12 includes a thickness X of 1.5 mm to 3.5 mm. In another embodiment, the head lap 22 of each of the roofing shingles 12 includes a thickness X of 1.5 mm to 3 mm. In another embodiment, the head lap 22 of each of the roofing shingles 12 includes a thickness X of 1.5 mm to 2.5 mm. In another embodiment, the head lap 22 of each of the roofing shingles 12 includes a thickness X of 1.5 mm to 2 mm.

In some embodiments, the head lap 22 of each of the roofing shingles 12 includes a thickness X of 2 mm to 5 mm. In another embodiment, the head lap 22 of each of the roofing shingles 12 includes a thickness X of 2 mm to 4.5 mm. In another embodiment, the head lap 22 of each of the roofing shingles 12 includes a thickness X of 2 mm to 4 mm.

In another embodiment, the head lap 22 of each of the roofing shingles 12 includes a thickness X of 2 mm to 3.5 mm. In another embodiment, the head lap 22 of each of the roofing shingles 12 includes a thickness X of 2 mm to 3 mm. In another embodiment, the head lap 22 of each of the roofing shingles 12 includes a thickness X of 2 mm to 2.5 mm.

In some embodiments, the head lap 22 of each of the roofing shingles 12 includes a thickness X of 2.5 mm to 5 mm. In another embodiment, the head lap 22 of each of the roofing shingles 12 includes a thickness X of 2.5 mm to 4.5 mm. In another embodiment, the head lap 22 of each of the roofing shingles 12 includes a thickness X of 2.5 mm to 4 mm. In another embodiment, the head lap 22 of each of the roofing shingles 12 includes a thickness X of 2.5 mm to 3.5 mm. In another embodiment, the head lap 22 of each of the roofing shingles 12 includes a thickness X of 2.5 mm to 3 mm.

In some embodiments, the head lap 22 of each of the roofing shingles 12 includes a thickness X of 3 mm to 5 mm. In another embodiment, the head lap 22 of each of the roofing shingles 12 includes a thickness X of 3 mm to 4.5 mm. In another embodiment, the head lap 22 of each of the roofing shingles 12 includes a thickness X of 3 mm to 4 mm. In another embodiment, the head lap 22 of each of the roofing shingles 12 includes a thickness X of 3 mm to 3.5 mm.

In some embodiments, the head lap 22 of each of the roofing shingles 12 includes a thickness X of 3.5 mm to 5 mm. In another embodiment, the head lap 22 of each of the roofing shingles 12 includes a thickness X of 3.5 mm to 4.5 mm. In another embodiment, the head lap 22 of each of the roofing shingles 12 includes a thickness X of 3.5 mm to 4 mm. In some embodiments, the head lap 22 of each of the roofing shingles 12 includes a thickness X of 4 mm to 5 mm. In another embodiment, the head lap 22 of each of the roofing shingles 12 includes a thickness X of 4 mm to 4.5 mm. In some embodiments, the head lap 22 of each of the roofing shingles 12 includes a thickness X of 4.5 mm to 5 mm.

In some embodiments, the head lap 22 of each of the roofing shingles 12 includes a thickness X of 0.1 mm. In some embodiments, the head lap 22 of each of the roofing shingles 12 includes a thickness X of 0.5 mm. In some embodiments, the head lap 22 of each of the roofing shingles 12 includes a thickness X of 1 mm. In some embodiments, the head lap 22 of each of the roofing shingles 12 includes a thickness X of 1.5 mm. In some embodiments, the head lap 22 of each of the roofing shingles 12 includes a thickness X of 2 mm. In some embodiments, the head lap 22 of each of the roofing shingles 12 includes a thickness X of 2.5 mm. In some embodiments, the head lap 22 of each of the roofing shingles 12 includes a thickness X of 3 mm. In some embodiments, the head lap 22 of each of the roofing shingles 12 includes a thickness X of 3.5 mm. In some embodiments, the head lap 22 of each of the roofing shingles 12 includes a thickness X of 4 mm. In some embodiments, the head lap 22 of each of the roofing shingles 12 includes a thickness X of 4.5 mm. In some embodiments, the head lap 22 of each of the roofing shingles 12 includes a thickness X of 5 mm.

In some embodiments, each of the at least one first groove 28 and the at least one second groove 36 includes a depth Y. In some embodiments, the depth Y is calculated by the following formula:

$$Y = a*X$$

where X is the thickness X of the head lap 22 and "a" is 0.1 to 0.99.

In some embodiments, the depth Y is 0.01 mm to 4 mm. In some embodiments, the depth Y is 0.01 mm to 3.5 mm. In some embodiments, the depth Y is 0.01 mm to 3 mm. In some embodiments, the depth Y is 0.01 mm to 2.5 mm. In some embodiments, the depth Y is 0.01 mm to 2 mm. In some embodiments, the depth Y is 0.01 mm to 1.5 mm. In some embodiments, the depth Y is 0.01 mm to 1 mm. In some embodiments, the depth Y is 0.01 mm to 0.5 mm. In some embodiments, the depth Y is 0.5 mm to 4 mm. In some embodiments, the depth Y is 0.5 mm to 3.5 mm. In some embodiments, the depth Y is 0.5 mm to 3 mm. In some embodiments, the depth Y is 0.5 mm to 2.5 mm. In some embodiments, the depth Y is 0.5 mm to 2 mm. In some embodiments, the depth Y is 0.5 mm to 1.5 mm. In some embodiments, the depth Y is 0.5 mm to 1 mm.

In some embodiments, the depth Y is 1 mm to 4 mm. In some embodiments, the depth Y is 1 mm to 3.5 mm. In some embodiments, the depth Y is 1 mm to 3 mm. In some embodiments, the depth Y is 1 mm to 2.5 mm. In some embodiments, the depth Y is 1 mm to 2 mm. In some embodiments, the depth Y is 1 mm to 1.5 mm. In some embodiments, the depth Y is 1.5 mm to 4 mm. In some embodiments, the depth Y is 1.5 mm to 3.5 mm. In some embodiments, the depth Y is 1.5 mm to 3 mm. In some embodiments, the depth Y is 1.5 mm to 2.5 mm. In some embodiments, the depth Y is 1.5 mm to 2 mm. In some embodiments, the depth Y is 2 mm to 4 mm. In some embodiments, the depth Y is 2 mm to 3.5 mm. In some embodiments, the depth Y is 2 mm to 3 mm. In some embodiments, the depth Y is 2 mm to 2.5 mm. In some embodiments, the depth Y is 2.5 mm to 4 mm. In some embodiments, the depth Y is 2.5 mm to 3.5 mm. In some embodiments, the depth Y is 2.5 mm to 3 mm. In some embodiments, the depth Y is 3 mm to 4 mm. In some embodiments, the depth Y is 3 mm to 3.5 mm. In some embodiments, the depth Y is 3.5 mm to 4 mm.

In some embodiments, the depth Y is 0.01 mm. In some embodiments, the depth Y is 0.5 mm. In some embodiments, the depth Y is 1 mm. In some embodiments, the depth Y is 1.5 mm. In some embodiments, the depth Y is 2 mm. In some embodiments, the depth Y is 2.5 mm. In some embodiments, the depth Y is 3 mm. In some embodiments, the depth Y is 3.5 mm. In some embodiments, the depth Y is 4 mm.

In some embodiments, each of the at least one first groove 28 and the at least one second groove 36 includes a width D1. In some embodiments, the width D1 is from 2 mm to 9 mm. In another embodiment, the width D1 is from 2 mm to 8 mm. In another embodiment, the width D1 is from 2 mm to 7 mm. In another embodiment, the width D1 is from 2 mm to 6 mm. In another embodiment, the width D1 is from 2 mm to 5 mm. In another embodiment, the width D1 is from 2 mm to 4 mm. In another embodiment, the width D1 is from 2 mm to 3 mm. In some embodiments, the width D1 is from 3 mm to 9 mm. In another embodiment, the width D1 is from 3 mm to 8 mm. In another embodiment, the width D1 is from 3 mm to 7 mm. In another embodiment, the width D1 is from 3 mm to 6 mm. In another embodiment, the width D1 is from 3 mm to 5 mm. In another embodiment, the width D1 is from 3 mm to 4 mm.

In some embodiments, the width D1 is from 4 mm to 9 mm. In another embodiment, the width D1 is from 4 mm to 8 mm. In another embodiment, the width D1 is from 4 mm to 7 mm. In another embodiment, the width D1 is from 4 mm to 6 mm. In another embodiment, the width D1 is from 4 mm to 5 mm. In some embodiments, the width D1 is from 5 mm to 9 mm. In another embodiment, the width D1 is from 5 mm to 8 mm. In another embodiment, the width D1 is from 5 mm to 7 mm. In another embodiment, the width D1 is from 5 mm to 6 mm. In some embodiments, the width D1 is from 6 mm to 9 mm. In some embodiment, the width D1 is from 6 mm to 8 mm. In another embodiment, the width D1 is from 6 mm to 7 mm. In some embodiments, the width D1 is from 7 mm to 9 mm. In another embodiment, the width D1 is from 7 mm to 8 mm. In another embodiment, the width D1 is from 8 mm to 9 mm.

In some embodiments, the width D1 is 2 mm. In some embodiments, the width D1 is 3 mm. In some embodiments, the width D1 is 4 mm. In some embodiments, the width D1 is 5 mm. In some embodiments, the width D1 is 6 mm. In some embodiments, the width D1 is 7 mm. In some embodiments, the width D1 is 8 mm. In some embodiments, the width D1 is 9 mm.

In some embodiments, each of the at least one first groove 28 and the at least one second groove 36 is formed by and located intermediate a corresponding pair of groove walls 48. In some embodiments, each of the groove walls 48 includes a width D2. In some embodiments, the width D2 is calculated by the following formula:

$$D2 = b*D1$$

where D1 is the width D1 and "b" is 0.1 to 1. In some embodiments, the width D2 is 0.5 mm to 5 mm. In another embodiment, the width D2 is 0.5 mm to 4.5 mm. In another embodiment, the width D2 is 0.5 mm to 4 mm. In another embodiment, the width D2 is 0.5 mm to 3.5 mm. In another embodiment, the width D2 is 0.5 mm to 3 mm. In another embodiment, the width D2 is 0.5 mm to 2.5 mm. In another embodiment, the width D2 is 0.5 mm to 2 mm. In another embodiment, the width D2 is 0.5 mm to 1.5 mm. In another embodiment, the width D2 is 0.5 mm to 1 mm. In some embodiments, the width D2 is 1 mm to 5 mm. In another embodiment, the width D2 is 1 mm to 4.5 mm. In another embodiment, the width D2 is 1 mm to 4 mm. In another embodiment, the width D2 is 1 mm to 3.5 mm. In another embodiment, the width D2 is 1 mm to 3 mm. In another embodiment, the width D2 is 1 mm to 2.5 mm. In another embodiment, the width D2 is 1 mm to 2 mm. In another embodiment, the width D2 is 1 mm to 1.5 mm.

In some embodiments, the width D2 is 1.5 mm to 5 mm. In another embodiment, the width D2 is 1.5 mm to 4.5 mm. In another embodiment, the width D2 is 1.5 mm to 4 mm. In another embodiment, the width D2 is 1.5 mm to 3.5 mm. In another embodiment, the width D2 is 1.5 mm to 3 mm. In another embodiment, the width D2 is 1.5 mm to 2.5 mm. In another embodiment, the width D2 is 1.5 mm to 2 mm. In some embodiments, the width D2 is 2 mm to 5 mm. In another embodiment, the width D2 is 2 mm to 4.5 mm. In another embodiment, the width D2 is 2 mm to 4 mm. In another embodiment, the width D2 is 2 mm to 3.5 mm. In another embodiment, the width D2 is 2 mm to 3 mm. In another embodiment, the width D2 is 2 mm to 2.5 mm.

In some embodiments, the width D2 is 2.5 mm to 5 mm. In another embodiment, the width D2 is 2.5 mm to 4.5 mm. In another embodiment, the width D2 is 2.5 mm to 4 mm. In another embodiment, the width D2 is 2.5 mm to 3.5 mm. In another embodiment, the width D2 is 2.5 mm to 3 mm. In some embodiments, the width D2 is 3 mm to 5 mm. In another embodiment, the width D2 is 3 mm to 4.5 mm. In another embodiment, the width D2 is 3 mm to 4 mm. In another embodiment, the width D2 is 3 mm to 3.5 mm. In some embodiments, the width D2 is 3.5 mm to 5 mm. In another embodiment, the width D2 is 3.5 mm to 4.5 mm. In another embodiment, the width D2 is 3.5 mm to 4 mm. In some embodiments, the width D2 is 4 mm to 5 mm. In another embodiment, the width D2 is 4 mm to 4.5 mm. In some embodiments, the width D2 is 4.5 mm to 5 mm.

In some embodiments, the width D2 is 0.5 mm. In some embodiments, the width D2 is 1 mm. In some embodiments, the width D2 is 1.5 mm. In some embodiments, the width D2 is 2 mm. In some embodiments, the width D2 is 2.5 mm. In some embodiments, the width D2 is 3 mm. In some embodiments, the width D2 is 3.5 mm. In some embodiments, the width D2 is 4 mm. In some embodiments, the width D2 is 4.5 mm. In some embodiments, the width D2 is 5 mm.

In some embodiments, each of the roofing shingles 12 is composed of a polymer. In some embodiments, each of the roofing shingles 12 includes thermoplastic polyolefin (TPO). In other embodiments, each of the photovoltaic shingles includes polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide; polyvinyl chloride (PVC); ethylene propylene diene monomer (EPDM) rubber; silicone rubber; fluoropolymers—ethylene tetrafluoroethylene (ETFE), polyvinylidene fluoride (PVDF), tetrafluoroethylene-hexafluoropropylene copolymers (FEP), and tetrafluoroethylene-hexafluoropropylene-vinylidene fluoride copolymers (THV), or blends thereof.

Referring back to FIGS. 1 and 2, in some embodiments, the first end 14 of the second photovoltaic shingle 12b is adjacent to the second end 16 of the first photovoltaic shingle 12a. In some embodiments, the head lap 22 of the first photovoltaic shingle 12a and the head lap 22 of the second photovoltaic shingle 12b form a seam 46 therebetween. In some embodiments, a third photovoltaic shingle 12c overlays the first photovoltaic shingle 12a and the second photovoltaic shingle 12b.

In some embodiments, a longitudinal axis X-X of the at least one first groove 28 does not intersect a longitudinal axis Y-Y of the seam 46. In some embodiments, the at least one first groove 28 extends 45 degrees relative to the longitudinal axis Y-Y of seam 46 (see FIG. 1). In another embodiment, the at least one first groove 28 extends approximately 45 degrees relative to the longitudinal axis Y-Y of the seam 46. In some embodiments, the at least one first groove 28 extends zero (0) degrees relative to the longitudinal axis Y-Y of seam 46 (see FIG. 2). In another embodiment, the at least one first groove 28 extends approximately zero (0) degrees relative to the longitudinal axis Y-Y of the seam 46.

In another embodiment, the at least one first groove 28 extends zero (0) degrees to 45 degrees relative to the longitudinal axis Y-Y of the seam 46. In another embodiment, the at least one first groove 28 extends zero (0) degrees to 40 degrees relative to the longitudinal axis Y-Y of the seam 46. In another embodiment, the at least one first groove 28 extends zero (0) degrees to 35 degrees relative to the longitudinal axis Y-Y of the seam 46. In another embodiment, the at least one first groove 28 extends zero (0) degrees to 30 degrees relative to the longitudinal axis Y-Y of the seam 46. In another embodiment, the at least one first groove 28 extends zero (0) degrees to 25 degrees relative to the longitudinal axis Y-Y of the seam 46. In another embodiment, the at least one first groove 28 extends zero (0) degrees to 20 degrees relative to the longitudinal axis Y-Y of the seam 46. In another embodiment, the at least one first groove 28 extends zero (0) degrees to 15 degrees relative to the longitudinal axis Y-Y of the seam 46. In another embodiment, the at least one first groove 28 extends zero (0) degrees to 10 degrees relative to the longitudinal axis Y-Y of the seam 46. In another embodiment, the at least one first groove 28 extends zero (0) degrees to 5 degrees relative to the longitudinal axis Y-Y of the seam 46.

In another embodiment, the at least one first groove 28 extends 5 degrees to 45 degrees relative to the longitudinal axis Y-Y of the seam 46. In another embodiment, the at least one first groove 28 extends 5 degrees to 40 degrees relative to the longitudinal axis Y-Y of the seam 46. In another embodiment, the at least one first groove 28 extends 5 degrees to 35 degrees relative to the longitudinal axis Y-Y of the seam 46. In another embodiment, the at least one first groove 28 extends 5 degrees to 30 degrees relative to the longitudinal axis Y-Y of the seam 46. In another embodiment, the at least one first groove 28 extends 5 degrees to 25 degrees relative to the longitudinal axis Y-Y of the seam 46. In another embodiment, the at least one first groove 28 extends 5 degrees to 20 degrees relative to the longitudinal axis Y-Y of the seam 46. In another embodiment, the at least one first groove 28 extends 5 degrees to 15 degrees relative to the longitudinal axis Y-Y of the seam 46. In another embodiment, the at least one first groove 28 extends 5 degrees to 10 degrees relative to the longitudinal axis Y-Y of the seam 46. In another embodiment, the at least one first groove 28 extends 10 degrees to 45 degrees relative to the longitudinal axis Y-Y of the seam 46. In another embodiment, the at least one first groove 28 extends 10 degrees to 40 degrees relative to the longitudinal axis Y-Y of the seam 46. In another embodiment, the at least one first groove 28 extends 10 degrees to 35 degrees relative to the longitudinal axis Y-Y of the seam 46. In another embodiment, the at least one first groove 28 extends 10 degrees to 30 degrees relative to the longitudinal axis Y-Y of the seam 46. In another embodiment, the at least one first groove 28 extends 10 degrees to 25 degrees relative to the longitudinal axis Y-Y of the seam 46. In another embodiment, the at least one first groove 28 extends 10 degrees to 20 degrees relative to the longitudinal axis Y-Y of the seam 46. In another embodiment, the at least one first groove 28 extends 10 degrees to 15 degrees relative to the longitudinal axis Y-Y of the seam 46.

In another embodiment, the at least one first groove 28 extends 15 degrees to 45 degrees relative to the longitudinal axis Y-Y of the seam 46. In another embodiment, the at least one first groove 28 extends 15 degrees to 40 degrees relative to the longitudinal axis Y-Y of the seam 46.

In another embodiment, the at least one first groove 28 extends 15 degrees to 35 degrees relative to the longitudinal axis Y-Y of the seam 46. In another embodiment, the at least one first groove 28 extends 15 degrees to 30 degrees relative to the longitudinal axis Y-Y of the seam 46. In another embodiment, the at least one first groove 28 extends 15 degrees to 25 degrees relative to the longitudinal axis Y-Y of the seam 46. In another embodiment, the at least one first groove 28 extends 15 degrees to 20 degrees relative to the longitudinal axis Y-Y of the seam 46.

In another embodiment, the at least one first groove 28 extends 20 degrees to 45 degrees relative to the longitudinal axis Y-Y of the seam 46. In another embodiment, the at least one first groove 28 extends 20 degrees to 40 degrees relative to the longitudinal axis Y-Y of the seam 46. In another embodiment, the at least one first groove 28 extends 20 degrees to 35 degrees relative to the longitudinal axis Y-Y of the seam 46. In another embodiment, the at least one first groove 28 extends 20 degrees to 30 degrees relative to the longitudinal axis Y-Y of the seam 46. In another embodiment, the at least one first groove 28 extends 20 degrees to 25 degrees relative to the longitudinal axis Y-Y of the seam 46.

In another embodiment, the at least one first groove 28 extends 25 degrees to 45 degrees relative to the longitudinal axis Y-Y of the seam 46. In another embodiment, the at least one first groove 28 extends 25 degrees to 40 degrees relative to the longitudinal axis Y-Y of the seam 46. In another embodiment, the at least one first groove 28 extends 25 degrees to 35 degrees relative to the longitudinal axis Y-Y of the seam 46. In another embodiment, the at least one first groove 28 extends 25 degrees to 30 degrees relative to the longitudinal axis Y-Y of the seam 46.

In another embodiment, the at least one first groove 28 extends 30 degrees to 45 degrees relative to the longitudinal axis Y-Y of the seam 46. In another embodiment, the at least one first groove 28 extends 30 degrees to 40 degrees relative to the longitudinal axis Y-Y of the seam 46. In another embodiment, the at least one first groove 28 extends 30 degrees to 35 degrees relative to the longitudinal axis Y-Y of the seam 46. In another embodiment, the at least one first groove 28 extends 35 degrees to 45 degrees relative to the longitudinal axis Y-Y of the seam 46. In another embodiment, the at least one first groove 28 extends 35 degrees to 40 degrees relative to the longitudinal axis Y-Y of the seam 46. In another embodiment, the at least one first groove 28 extends 40 degrees to 45 degrees relative to the longitudinal axis Y-Y of the seam 46.

In some embodiments, the at least one first groove 28 extends 5 degrees relative to the longitudinal axis Y-Y of the seam 46. In some embodiments, the at least one first groove 28 extends 10 degrees relative to the longitudinal axis Y-Y of the seam 46. In some embodiments, the at least one first groove 28 extends 15 degrees relative to the longitudinal axis Y-Y of the seam 46. In some embodiments, the at least one first groove 28 extends 20 degrees relative to the longitudinal axis Y-Y of the seam 46. In some embodiments, the at least one first groove 28 extends 25 degrees relative to the longitudinal axis Y-Y of the seam 46. In some embodiments, the at least one first groove 28 extends 30 degrees relative to the longitudinal axis Y-Y of the seam 46. In some embodiments, the at least one first groove 28 extends 35 degrees relative to the longitudinal axis Y-Y of the seam 46. In some embodiments, the at least one first groove 28 extends 40 degrees relative to the longitudinal axis Y-Y of the seam 46.

In some embodiments, each of the at least one first groove 28 is configured to shed and redirect water away from the seam 46. It should be understood that the foregoing features and positioning would apply to the at least one second groove 36 with the addition of one of the roofing shingles 12 positioned adjacent to the second end 16 of the second photovoltaic shingle 12b and forming a second seam.

In some embodiments, the roofing shingles 12 are installed to a roof deck. In some embodiments, each of the roofing shingles 12 is installed on the roof deck by a plurality of fasteners. In some embodiments, the plurality of fasteners are installed through the head lap 22. In some embodiments, the plurality of fasteners includes a plurality of nails. In another embodiment, each of the roofing shingles 12 is installed on the roof deck by an adhesive. In some embodiments, the reveal portion 42 of the roofing shingle 12 overlays the head lap 22 of at least another one of the roofing shingles 12.

FIGS. 4A and 4B show an embodiment of a jig 50 for making the roofing shingles 12. In some embodiments, the jig 50 includes a groove pattern 52 for the at least one first groove 28 and the at least one second groove 36. In some embodiments, the groove pattern 52 includes a cut-out section 54 for at least one nailing zone 56. In some embodiments, the groove pattern 52 includes a section 58 for placement of an electrical component, such as but not limited to a junction box, and a section 60 for placement of the at least one solar module.

Figure 5:
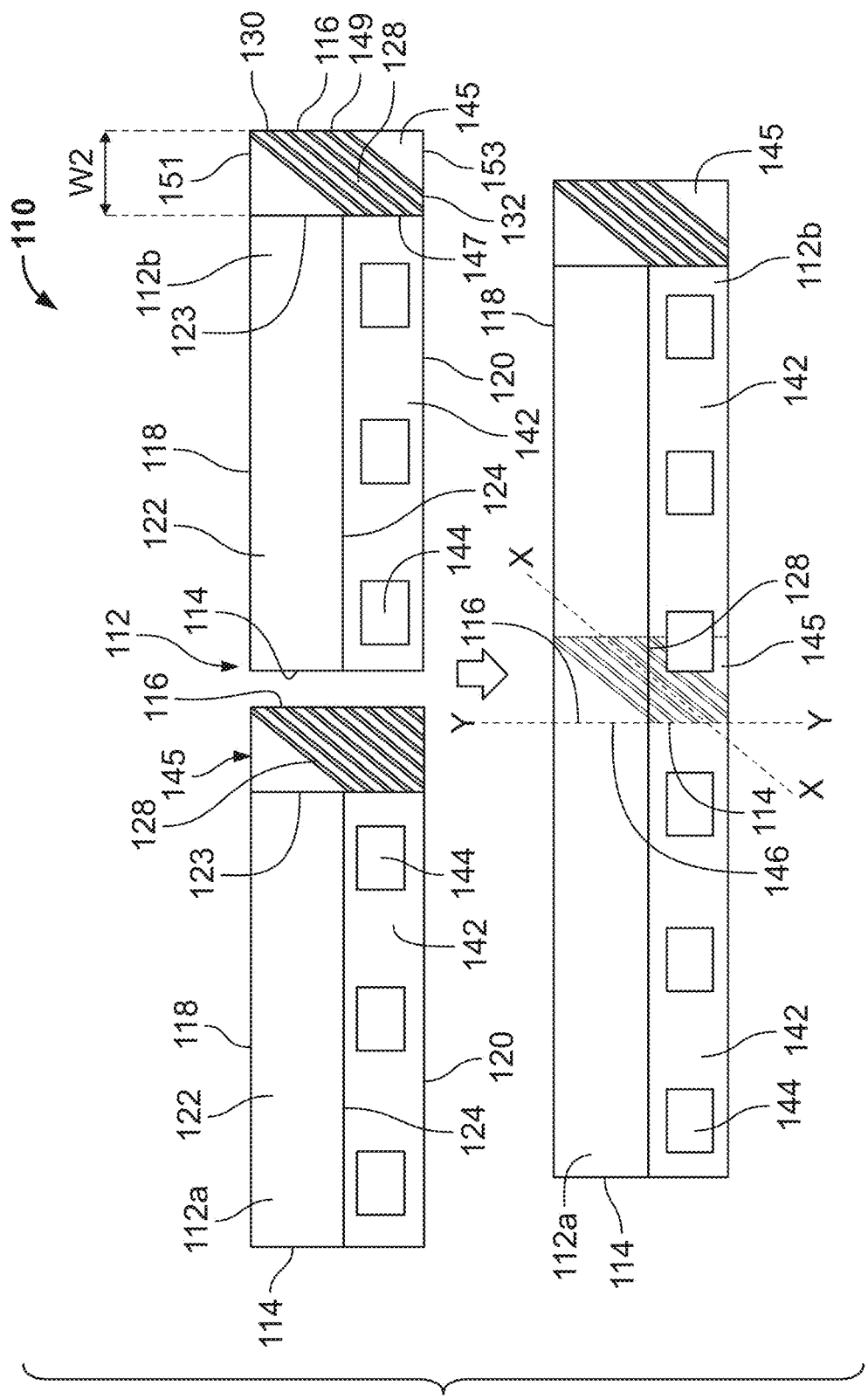
FIG. 5 is a top plan view of an embodiment of a system including a plurality of photovoltaic shingles.
Figure 6:
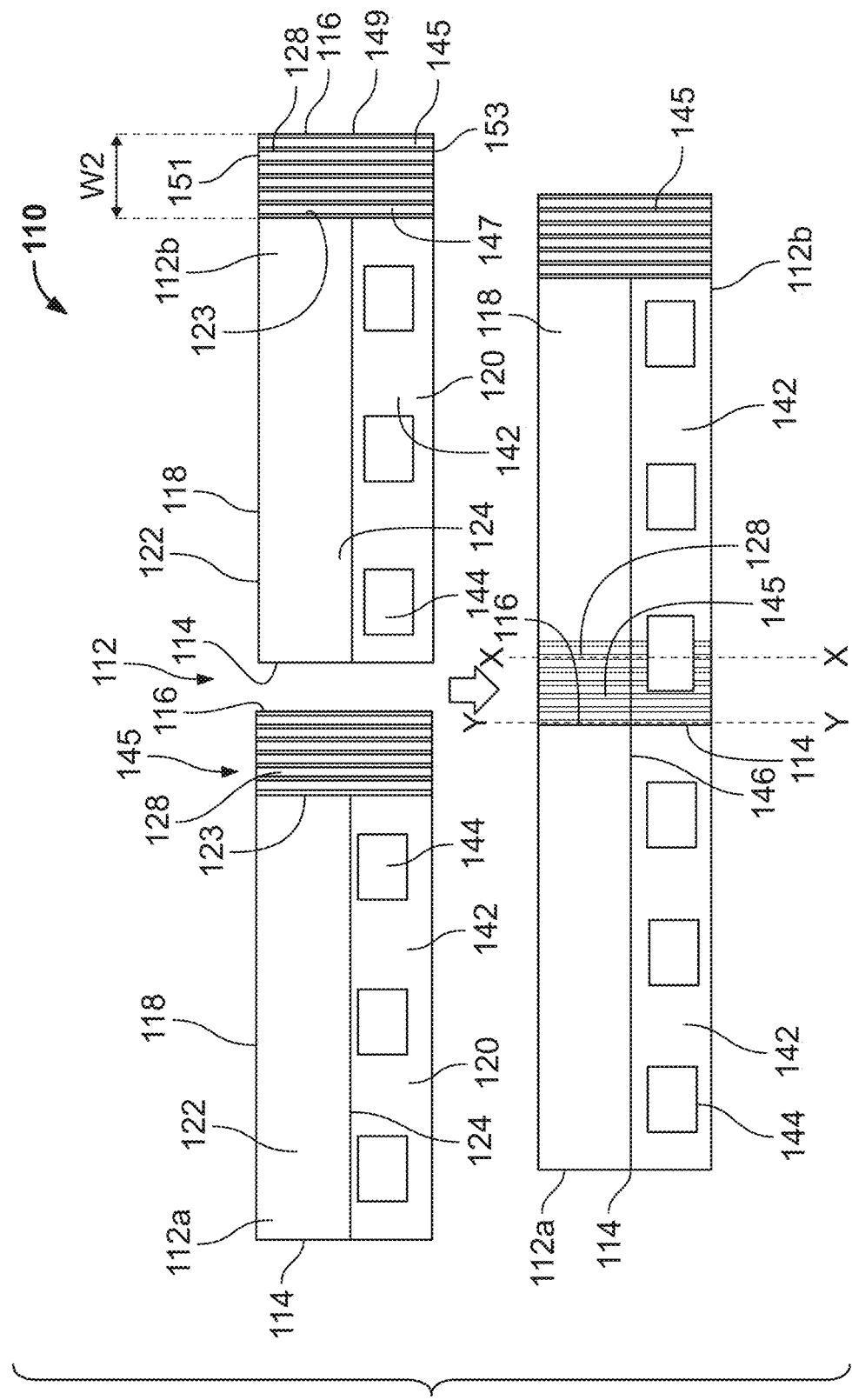
FIG. 6 is a top plan view of another embodiment of a system including a plurality of photovoltaic shingles.

Referring to FIGS. 5 and 6, in some embodiments, a system 110 includes a plurality of roofing shingles 112. In some embodiments, the plurality of roofing shingles 112 includes a first photovoltaic shingle 112a and a second photovoltaic shingle 112b. In some embodiments, each of the plurality of roofing shingles 112 includes a first end 114, a second end 116 opposite the first end 114, a first edge 118 extending from the first end 114 to the second end 116, and a second edge 120 opposite the first edge 118 and extending from the first end 114 to the second end 116. In some embodiments, each of the plurality of roofing shingles 112 includes a head lap 122. In some embodiments, the head lap 122 extends from the first end 114 to a first location 123 intermediate the first end and 114 the second end 116 and extending from the first edge 118 to a second location 124 intermediate the first edge 118 and the second edge 120.

In some embodiments, each of the roofing shingles 112 includes a reveal portion 142. In some embodiments, the reveal portion 142 extends from the first end 114 to the first location 123 and from the second edge 120 to the second location 124. In some embodiments, the reveal portion 142 is located adjacent to the head lap 122. In some embodiments, the reveal portion 142 includes at least one solar cell 144. In some embodiments, the at least one solar cell 144 includes a plurality of the solar cells 144.

In some embodiments, each of the roofing shingles 112 includes a side lap 145. In some embodiments, the side lap 145 is located at the second end 116. In another embodiment, the side lap 145 is located at the first end 114. In some embodiments, the side lap 145 includes a first end 147 and a second end 149 opposite the first end 147, a first edge 151 extending from the first end 147 to the second end 149, and a second edge 153 opposite the first edge 151 and extending from the first end 147 to the second end 149.

In some embodiments, the side lap 145 is square in shape. In another embodiment, the side lap 145 is rectangular in shape. In other embodiments, the side lap 145 includes other suitable shapes and sizes.

In some embodiments, the reveal portion 142 includes a width W1. In some embodiments, the side lap 145 includes a width W2.

In some embodiments, the width W2 of the side lap 145 is 5% to 150% of the width W1 of the reveal portion 142. In some embodiments, the width W2 of the side lap 145 is 5% to 140% of the width W1 of the reveal portion 142. In some embodiments, the width W2 of the side lap 145 is 5% to 130% of the width W1 of the reveal portion 142. In some embodiments, the width W2 of the side lap 145 is 5% to 120% of the width W1 of the reveal portion 142. In some embodiments, the width W2 of the side lap 145 is 5% to 110% of the width W1 of the reveal portion 142. In some embodiments, the width W2 of the side lap 145 is 5% to 100% of the width W1 of the reveal portion 142. In some embodiments, the width W2 of the side lap 145 is 5% to 90% of the width W1 of the reveal portion 142. In some embodiments, the width W2 of the side lap 145 is 5% to 80% of the width W1 of the reveal portion 142. In some embodiments, the width W2 of the side lap 145 is 5% to 70% of the width W1 of the reveal portion 142. In some embodiments, the width W2 of the side lap 145 is 5% to 60% of the width W1 of the reveal portion 142. In some embodiments, the width W2 of the side lap 145 is 5% to 50% of the width W1 of the reveal portion 142. In some embodiments, the width W2 of the side lap 145 is 5% to 40% of the width W1 of the reveal portion 142. In some embodiments, the width W2 of the side lap 145 is 5% to 30% of the width W1 of the reveal portion 142. In some embodiments, the width W2 of the side lap 145 is 5% to 20% of the width W1 of the reveal portion 142. In some embodiments, the width W2 of the side lap 145 is 5% to 10% of the width W1 of the reveal portion 142.

In some embodiments, the width W2 of the side lap 145 is 10% to 150% of the width W1 of the reveal portion 142. In some embodiments, the width W2 of the side lap 145 is 10% to 140% of the width W1 of the reveal portion 142. In some embodiments, the width W2 of the side lap 145 is 10% to 130% of the width W1 of the reveal portion 142. In some embodiments, the width W2 of the side lap 145 is 10% to 120% of the width W1 of the reveal portion 142. In some embodiments, the width W2 of the side lap 145 is 10% to 110% of the width W1 of the reveal portion 142. In some embodiments, the width W2 of the side lap 145 is 10% to 100% of the width W1 of the reveal portion 142. In some embodiments, the width W2 of the side lap 145 is 10% to 90% of the width W1 of the reveal portion 142. In some embodiments, the width W2 of the side lap 145 is 10% to 80% of the width W1 of the reveal portion 142. In some embodiments, the width W2 of the side lap 145 is 10% to 70% of the width W1 of the reveal portion 142. In some embodiments, the width W2 of the side lap 145 is 10% to 60% of the width W1 of the reveal portion 142. In some embodiments, the width W2 of the side lap 145 is 10% to 50% of the width W1 of the reveal portion 142. In some embodiments, the width W2 of the side lap 145 is 10% to 40% of the width W1 of the reveal portion 142. In some embodiments, the width W2 of the side lap 145 is 10% to 30% of the width W1 of the reveal portion 142. In some embodiments, the width W2 of the side lap 145 is 10% to 20% of the width W1 of the reveal portion 142.

In some embodiments, the width W2 of the side lap 145 is 20% to 150% of the width W1 of the reveal portion 142. In some embodiments, the width W2 of the side lap 145 is 20% to 140% of the width W1 of the reveal portion 142. In some embodiments, the width W2 of the side lap 145 is 20% to 130% of the width W1 of the reveal portion 142. In some embodiments, the width W2 of the side lap 145 is 20% to 120% of the width W1 of the reveal portion 142. In some embodiments, the width W2 of the side lap 145 is 20% to 110% of the width W1 of the reveal portion 142. In some embodiments, the width W2 of the side lap 145 is 20% to 100% of the width W1 of the reveal portion 142. In some embodiments, the width W2 of the side lap 145 is 20% to 90% of the width W1 of the reveal portion 142. In some embodiments, the width W2 of the side lap 145 is 20% to 80% of the width W1 of the reveal portion 142. In some embodiments, the width W2 of the side lap 145 is 20% to 70% of the width W1 of the reveal portion 142. In some embodiments, the width W2 of the side lap 145 is 20% to 60% of the width W1 of the reveal portion 142. In some embodiments, the width W2 of the side lap 145 is 20% to 50% of the width W1 of the reveal portion 142. In some embodiments, the width W2 of the side lap 145 is 20% to 40% of the width W1 of the reveal portion 142. In some embodiments, the width W2 of the side lap 145 is 20% to 30% of the width W1 of the reveal portion 142.

In some embodiments, the width W2 of the side lap 145 is 30% to 150% of the width W1 of the reveal portion 142. In some embodiments, the width W2 of the side lap 145 is 30% to 140% of the width W1 of the reveal portion 142. In some embodiments, the width W2 of the side lap 145 is 30% to 130% of the width W1 of the reveal portion 142. In some embodiments, the width W2 of the side lap 145 is 30% to 120% of the width W1 of the reveal portion 142. In some embodiments, the width W2 of the side lap 145 is 30% to 110% of the width W1 of the reveal portion 142. In some embodiments, the width W2 of the side lap 145 is 30% to 100% of the width W1 of the reveal portion 142. In some embodiments, the width W2 of the side lap 145 is 30% to 90% of the width W1 of the reveal portion 142. In some embodiments, the width W2 of the side lap 145 is 30% to 80% of the width W1 of the reveal portion 142. In some embodiments, the width W2 of the side lap 145 is 30% to 70% of the width W1 of the reveal portion 142. In some embodiments, the width W2 of the side lap 145 is 30% to 60% of the width W1 of the reveal portion 142. In some embodiments, the width W2 of the side lap 145 is 30% to 50% of the width W1 of the reveal portion 142. In some embodiments, the width W2 of the side lap 145 is 30% to 40% of the width W1 of the reveal portion 142.

In some embodiments, the width W2 of the side lap 145 is 40% to 150% of the width W1 of the reveal portion 142. In some embodiments, the width W2 of the side lap 145 is 40% to 140% of the width W1 of the reveal portion 142. In some embodiments, the width W2 of the side lap 145 is 40% to 130% of the width W1 of the reveal portion 142. In some embodiments, the width W2 of the side lap 145 is 40% to 120% of the width W1 of the reveal portion 142. In some embodiments, the width W2 of the side lap 145 is 40% to 110% of the width W1 of the reveal portion 142. In some embodiments, the width W2 of the side lap 145 is 40% to 100% of the width W1 of the reveal portion 142. In some embodiments, the width W2 of the side lap 145 is 40% to 90% of the width W1 of the reveal portion 142. In some embodiments, the width W2 of the side lap 145 is 40% to 80% of the width W1 of the reveal portion 142. In some embodiments, the width W2 of the side lap 145 is 40% to 70% of the width W1 of the reveal portion 142. In some embodiments, the width W2 of the side lap 145 is 40% to 60% of the width W1 of the reveal portion 142. In some embodiments, the width W2 of the side lap 145 is 40% to 50% of the width W1 of the reveal portion 142.

In some embodiments, the width W2 of the side lap 145 is 50% to 150% of the width W1 of the reveal portion 142. In some embodiments, the width W2 of the side lap 145 is 50% to 140% of the width W1 of the reveal portion 142. In some embodiments, the width W2 of the side lap 145 is 50% to 130% of the width W1 of the reveal portion 142. In some embodiments, the width W2 of the side lap 145 is 50% to 120% of the width W1 of the reveal portion 142. In some embodiments, the width W2 of the side lap 145 is 50% to 110% of the width W1 of the reveal portion 142. In some embodiments, the width W2 of the side lap 145 is 50% to 100% of the width W1 of the reveal portion 142. In some embodiments, the width W2 of the side lap 145 is 50% to 90% of the width W1 of the reveal portion 142. In some embodiments, the width W2 of the side lap 145 is 50% to 80% of the width W1 of the reveal portion 142. In some embodiments, the width W2 of the side lap 145 is 50% to 70% of the width W1 of the reveal portion 142. In some embodiments, the width W2 of the side lap 145 is 50% to 60% of the width W1 of the reveal portion 142.

In some embodiments, the width W2 of the side lap 145 is 60% to 150% of the width W1 of the reveal portion 142. In some embodiments, the width W2 of the side lap 145 is 60% to 140% of the width W1 of the reveal portion 142. In some embodiments, the width W2 of the side lap 145 is 60% to 130% of the width W1 of the reveal portion 142. In some embodiments, the width W2 of the side lap 145 is 60% to 120% of the width W1 of the reveal portion 142. In some embodiments, the width W2 of the side lap 145 is 60% to 110% of the width W1 of the reveal portion 142. In some embodiments, the width W2 of the side lap 145 is 60% to 100% of the width W1 of the reveal portion 142. In some embodiments, the width W2 of the side lap 145 is 60% to 90% of the width W1 of the reveal portion 142. In some embodiments, the width W2 of the side lap 145 is 60% to 80% of the width W1 of the reveal portion 142. In some embodiments, the width W2 of the side lap 145 is 60% to 70% of the width W1 of the reveal portion 142.

In some embodiments, the width W2 of the side lap 145 is 70% to 150% of the width W1 of the reveal portion 142. In some embodiments, the width W2 of the side lap 145 is 70% to 140% of the width W1 of the reveal portion 142. In some embodiments, the width W2 of the side lap 145 is 70% to 130% of the width W1 of the reveal portion 142. In some embodiments, the width W2 of the side lap 145 is 70% to 120% of the width W1 of the reveal portion 142. In some embodiments, the width W2 of the side lap 145 is 70% to 110% of the width W1 of the reveal portion 142. In some embodiments, the width W2 of the side lap 145 is 70% to 100% of the width W1 of the reveal portion 142. In some embodiments, the width W2 of the side lap 145 is 70% to 90% of the width W1 of the reveal portion 142. In some embodiments, the width W2 of the side lap 145 is 70% to 80% of the width W1 of the reveal portion 142.

In some embodiments, the width W2 of the side lap 145 is 80% to 150% of the width W1 of the reveal portion 142. In some embodiments, the width W2 of the side lap 145 is 80% to 140% of the width W1 of the reveal portion 142. In some embodiments, the width W2 of the side lap 145 is 80% to 130% of the width W1 of the reveal portion 142. In some embodiments, the width W2 of the side lap 145 is 80% to 120% of the width W1 of the reveal portion 142. In some embodiments, the width W2 of the side lap 145 is 80% to 110% of the width W1 of the reveal portion 142. In some embodiments, the width W2 of the side lap 145 is 80% to 100% of the width W1 of the reveal portion 142. In some embodiments, the width W2 of the side lap 145 is 80% to 90% of the width W1 of the reveal portion 142.

In some embodiments, the width W2 of the side lap 145 is 90% to 150% of the width W1 of the reveal portion 142. In some embodiments, the width W2 of the side lap 145 is 90% to 140% of the width W1 of the reveal portion 142. In some embodiments, the width W2 of the side lap 145 is 90% to 130% of the width W1 of the reveal portion 142. In some embodiments, the width W2 of the side lap 145 is 90% to 120% of the width W1 of the reveal portion 142. In some embodiments, the width W2 of the side lap 145 is 90% to 110% of the width W1 of the reveal portion 142. In some embodiments, the width W2 of the side lap 145 is 90% to 100% of the width W1 of the reveal portion 142.

In some embodiments, the width W2 of the side lap 145 is 100% to 150% of the width W1 of the reveal portion 142. In some embodiments, the width W2 of the side lap 145 is 100% to 140% of the width W1 of the reveal portion 142. In some embodiments, the width W2 of the side lap 145 is 100% to 130% of the width W1 of the reveal portion 142. In some embodiments, the width W2 of the side lap 145 is 100% to 120% of the width W1 of the reveal portion 142. In some embodiments, the width W2 of the side lap 145 is 100% to 110% of the width W1 of the reveal portion 142.

In some embodiments, the width W2 of the side lap 145 is 110% to 150% of the width W1 of the reveal portion 142. In some embodiments, the width W2 of the side lap 145 is 110% to 140% of the width W1 of the reveal portion 142. In some embodiments, the width W2 of the side lap 145 is 110% to 130% of the width W1 of the reveal portion 142. In some embodiments, the width W2 of the side lap 145 is 110% to 120% of the width W1 of the reveal portion 142.

In some embodiments, the width W2 of the side lap 145 is 120% to 150% of the width W1 of the reveal portion 142. In some embodiments, the width W2 of the side lap 145 is 120% to 140% of the width W1 of the reveal portion 142. In some embodiments, the width W2 of the side lap 145 is 120% to 130% of the width W1 of the reveal portion 142.

In some embodiments, the width W2 of the side lap 145 is 130% to 150% of the width W1 of the reveal portion 142. In some embodiments, the width W2 of the side lap 145 is 130% to 140% of the width W1 of the reveal portion 142. In some embodiments, the width W2 of the side lap 145 is 140% to 150% of the width W1 of the reveal portion 142.

In some embodiments, the width W2 of the side lap 145 is 5% of the width W1 of the reveal portion 142. In some embodiments, the width W2 of the side lap 145 is 10% of the width W1 of the reveal portion 142. In some embodiments, the width W2 of the side lap 145 is 20% of the width W1 of the reveal portion 142. In some embodiments, the width W2 of the side lap 145 is 30% of the width W1 of the reveal portion 142. In some embodiments, the width W2 of the side lap 145 is 40% of the width W1 of the reveal portion 142. In some embodiments, the width W2 of the side lap 145 is 50% of the width W1 of the reveal portion 142. In some embodiments, the width W2 of the side lap 145 is 60% of the width W1 of the reveal portion 142. In some embodiments, the width W2 of the side lap 145 is 70% of the width W1 of the reveal portion 142. In some embodiments, the width W2 of the side lap 145 is 80% of the width W1 of the reveal portion 142. In some embodiments, the width W2 of the side lap 145 is 90% of the width W1 of the reveal portion 142. In some embodiments, the width W2 of the side lap 145 is 100% of the width W1 of the reveal portion 142. In some embodiments, the width W2 of the side lap 145 is 110% of the width W1 of the reveal portion 142. In some embodiments, the width W2 of the side lap 145 is 120% of the width W1 of the reveal portion 142. In some embodiments, the width W2 of the side lap 145 is 130% of the width W1 of the reveal portion 142. In some embodiments, the width W2 of the side lap 145 is 140% of the width W1 of the reveal portion 142. In some embodiments, the width W2 of the side lap 145 is 150% of the width W1 of the reveal portion 142.

In some embodiments, the side lap 145 includes at least one groove 128. In some embodiments, the at least one groove 128 includes a plurality of the grooves 128. In some embodiments, each of the at least one groove 128 extends from a first end 130 thereof, located proximate to the second end 149 and intermediate the first edge 151 and the second edge 153, a second end 132, located proximate to the first location 123. In some embodiments, the at least one groove 128 includes a size, shape, structure and function similar to those of the at least one first groove 28 and the at least one second groove 36 of the roofing shingles 12.

In some embodiments, each of the roofing shingles 112 is composed of a polymer. In some embodiments, each of the roofing shingles 112 includes thermoplastic polyolefin (TPO). In other embodiments, each of the photovoltaic shingles includes polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide; polyvinyl chloride (PVC); ethylene propylene diene monomer (EPDM) rubber; silicone rubber; fluoropolymers—ethylene tetrafluoroethylene (ETFE), polyvinylidene fluoride (PVDF), tetrafluoroethylene-hexafluoropropylene copolymers (FEP), and tetrafluoroethylene-hexafluoropropylene-vinylidene fluoride copolymers (THV), or blends thereof.

Still referring to FIGS. 5 and 6, in some embodiments, the first end 114 of the second photovoltaic shingle 112b overlays the side lap 145 of the first photovoltaic shingles 112a. In some embodiments, the head lap 122 of the first photovoltaic shingle 112a and the head lap 122 of the second photovoltaic shingle 112b form a seam 146 therebetween.

In some embodiments, a longitudinal axis X-X of the at least one groove 128 does not intersect a longitudinal axis Y-Y of the seam 146. In some embodiments, the at least one groove 128 extends 45 degrees relative to the longitudinal axis Y-Y of seam 146 (see FIG. 5). In another embodiment, the at least one groove 128 extends approximately 45 degrees relative to the longitudinal axis Y-Y of the seam 146. In some embodiments, the at least one groove 128 extends zero (0) degrees relative to the longitudinal axis of seam 146 (see FIG. 6). In another embodiment, the at least one groove 128 extends approximately zero (0) degrees relative to the longitudinal axis Y-Y of the seam 146.

In another embodiment, the at least one groove 128 extends zero (0) degrees to 45 degrees relative to the longitudinal axis Y-Y of the seam 146. In another embodiment, the at least one first groove 128 extends zero (0) degrees to 40 degrees relative to the longitudinal axis Y-Y of the seam 146. In another embodiment, the at least one first groove 128 extends zero (0) degrees to 35 degrees relative to the longitudinal axis Y-Y of the seam 146. In another embodiment, the at least one first groove 128 extends zero (0) degrees to 30 degrees relative to the longitudinal axis Y-Y of the seam 146. In another embodiment, the at least one first groove 128 extends zero (0) degrees to 25 degrees relative to the longitudinal axis Y-Y of the seam 146. In another embodiment, the at least one first groove 128 extends zero (0) degrees to 20 degrees relative to the longitudinal axis Y-Y of the seam 146. In another embodiment, the at least one first groove 128 extends zero (0) degrees to 15 degrees relative to the longitudinal axis Y-Y of the seam 146. In another embodiment, the at least one first groove 128 extends zero (0) degrees to 10 degrees relative to the longitudinal axis Y-Y of the seam 146. In another embodiment, the at least one first groove 128 extends zero (0) degrees to 5 degrees relative to the longitudinal axis Y-Y of the seam 146.

In another embodiment, the at least one first groove 128 extends 5 degrees to 45 degrees relative to the longitudinal axis Y-Y of the seam 146. In another embodiment, the at least one first groove 128 extends 5 degrees to 40 degrees relative to the longitudinal axis Y-Y of the seam 146. In another embodiment, the at least one first groove 128 extends 5 degrees to 35 degrees relative to the longitudinal axis Y-Y of the seam 146. In another embodiment, the at least one first groove 128 extends 5 degrees to 30 degrees relative to the longitudinal axis Y-Y of the seam 146. In another embodiment, the at least one first groove 128 extends 5 degrees to 25 degrees relative to the longitudinal axis Y-Y of the seam 146. In another embodiment, the at least one first groove 128 extends 5 degrees to 20 degrees relative to the longitudinal axis Y-Y of the seam 146. In another embodiment, the at least one first groove 128 extends 5 degrees to 15 degrees relative to the longitudinal axis Y-Y of the seam 146. In another embodiment, the at least one first groove 128 extends 5 degrees to 10 degrees relative to the longitudinal axis Y-Y of the seam 146.

In another embodiment, the at least one first groove 128 extends 10 degrees to 45 degrees relative to the longitudinal axis Y-Y of the seam 146. In another embodiment, the at least one first groove 128 extends 10 degrees to 40 degrees relative to the longitudinal axis Y-Y of the seam 146. In another embodiment, the at least one first groove 128 extends 10 degrees to 35 degrees relative to the longitudinal axis Y-Y of the seam 146. In another embodiment, the at least one first groove 128 extends 10 degrees to 30 degrees relative to the longitudinal axis Y-Y of the seam 146. In another embodiment, the at least one first groove 128 extends 10 degrees to 25 degrees relative to the longitudinal axis Y-Y of the seam 146. In another embodiment, the at least one first groove 128 extends 10 degrees to 20 degrees relative to the longitudinal axis Y-Y of the seam 146. In another embodiment, the at least one first groove 128 extends 10 degrees to 15 degrees relative to the longitudinal axis Y-Y of the seam 146.

In another embodiment, the at least one first groove 128 extends 15 degrees to 45 degrees relative to the longitudinal axis Y-Y of the seam 146. In another embodiment, the at least one first groove 128 extends 15 degrees to 40 degrees relative to the longitudinal axis Y-Y of the seam 146. In another embodiment, the at least one first groove 128 extends 15 degrees to 35 degrees relative to the longitudinal axis Y-Y of the seam 146. In another embodiment, the at least one first groove 128 extends 15 degrees to 30 degrees relative to the longitudinal axis Y-Y of the seam 146. In another embodiment, the at least one first groove 128 extends 15 degrees to 25 degrees relative to the longitudinal axis Y-Y of the seam 146. In another embodiment, the at least one first groove 128 extends 15 degrees to 20 degrees relative to the longitudinal axis Y-Y of the seam 146.

In another embodiment, the at least one first groove 128 extends 20 degrees to 45 degrees relative to the longitudinal axis Y-Y of the seam 146. In another embodiment, the at least one first groove 128 extends 20 degrees to 40 degrees relative to the longitudinal axis Y-Y of the seam 146. In another embodiment, the at least one first groove 128 extends 20 degrees to 35 degrees relative to the longitudinal axis Y-Y of the seam 146. In another embodiment, the at least one first groove 128 extends 20 degrees to 30 degrees relative to the longitudinal axis Y-Y of the seam 146. In another embodiment, the at least one first groove 128 extends 20 degrees to 25 degrees relative to the longitudinal axis Y-Y of the seam 146.

In another embodiment, the at least one first groove 128 extends 25 degrees to 45 degrees relative to the longitudinal axis Y-Y of the seam 146. In another embodiment, the at least one first groove 128 extends 25 degrees to 40 degrees relative to the longitudinal axis Y-Y of the seam 146. In another embodiment, the at least one first groove 128 extends 25 degrees to 35 degrees relative to the longitudinal axis Y-Y of the seam 146. In another embodiment, the at least one first groove 128 extends 25 degrees to 30 degrees relative to the longitudinal axis Y-Y of the seam 146.

In another embodiment, the at least one first groove 128 extends 30 degrees to 45 degrees relative to the longitudinal axis Y-Y of the seam 146. In another embodiment, the at least one first groove 128 extends 30 degrees to 40 degrees relative to the longitudinal axis Y-Y of the seam 146. In another embodiment, the at least one first groove 128 extends 30 degrees to 35 degrees relative to the longitudinal axis Y-Y of the seam 146. In another embodiment, the at least one first groove 128 extends 35 degrees to 45 degrees relative to the longitudinal axis Y-Y of the seam 146. In another embodiment, the at least one first groove 128 extends 35 degrees to 40 degrees relative to the longitudinal axis Y-Y of the seam 146. In another embodiment, the at least one first groove 128 extends 40 degrees to 45 degrees relative to the longitudinal axis Y-Y of the seam 146.

In some embodiments, the at least one first groove 128 extends 5 degrees relative to the longitudinal axis Y-Y of the seam 146. In some embodiments, the at least one first groove 128 extends 10 degrees relative to the longitudinal axis Y-Y of the seam 146. In some embodiments, the at least one first groove 128 extends 15 degrees relative to the longitudinal axis Y-Y of the seam 146. In some embodiments, the at least one first groove 128 extends 20 degrees relative to the longitudinal axis Y-Y of the seam 146. In some embodiments, the at least one first groove 128 extends 25 degrees relative to the longitudinal axis Y-Y of the seam 146. In some embodiments, the at least one first groove 128 extends 30 degrees relative to the longitudinal axis Y-Y of the seam 146. In some embodiments, the at least one first groove 128 extends 35 degrees relative to the longitudinal axis Y-Y of the seam 146. In some embodiments, the at least one first groove 128 extends 40 degrees relative to the longitudinal axis Y-Y of the seam 146.

In some embodiments, each of the at least one groove 128 is configured to shed and redirect water away from the seam 146.

Figure 7:
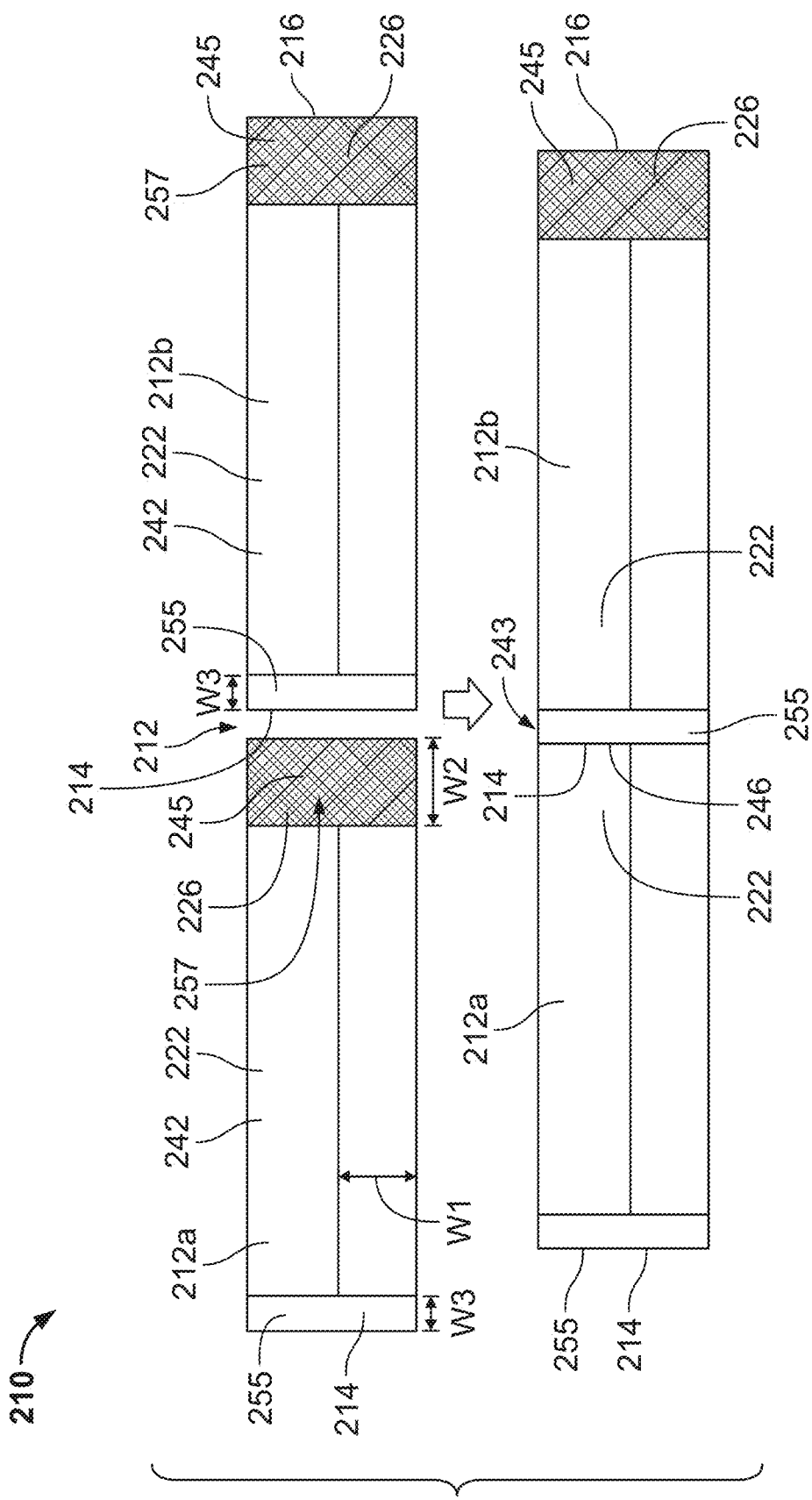
FIG. 7 is a top plan view of another embodiment of a system including a plurality of photovoltaic shingles.

Referring to FIG. 7, in some embodiments, a system 210 includes a plurality of roofing shingles 212. In some embodiments, the plurality of roofing shingles 212 includes a first photovoltaic shingle 212a and a second photovoltaic shingle 212b. In some embodiments, the roofing shingles 212 include a similar structure and function as the roofing shingles 112, except as provided as follows.

In some embodiments, each of the roofing shingles 212 includes a reveal portion 242, a first side lap 245 and a second side lap 255. In some embodiments, the first side lap 245 is located at a second end 216 and the second side lap 255 is located at the first end 214. In another embodiment, the first side lap 245 is located at the first end 214 and the second side lap 255 is located at the second end 216.

In some embodiments, the first side lap 245 includes a surface 226 having an adhesive 257. In some embodiments, a portion of the surface 226 includes the adhesive 257. In some embodiments, the adhesive 257 is a low-VOC bonding adhesive such as EverGuard® WB181 Bonding Adhesive manufactured by GAF®. In another embodiment, the adhesive 257 includes caulking. In another embodiment, the surface 226 of the first side lap 245 includes at least one adhesive strip 259 (see FIG. 8). In some embodiments, the at least one adhesive strip 259 includes a plurality of the adhesive strips 259. In some embodiments, the at least one adhesive strip 259 is an adhesive tape. In some embodiments, the adhesive tape is butyl tape. In some embodiments, at least one sheet of film is removably attached to the surface. In some embodiments, the film is a peel and stick film sheet. In some embodiments, the film is composed of EverGuard® Freedom HW peel and stick membrane manufactured by GAF®.

In some embodiments, the reveal portion 242 includes a width W1. In some embodiments, the first side lap 245 includes a width W2.

In some embodiments, the width W2 of the first side lap 245 is 5% to 150% of the width W1 of the reveal portion 242. In some embodiments, the width W2 of the first side lap 245 is 5% to 140% of the width W1 of the reveal portion 242. In some embodiments, the width W2 of the first side lap 245 is 5% to 130% of the width W1 of the reveal portion 242. In some embodiments, the width W2 of the first side lap 245 is 5% to 120% of the width W1 of the reveal portion 242. In some embodiments, the width W2 of the first side lap 245 is 5% to 110% of the width W1 of the reveal portion 242. In some embodiments, the width W2 of the first side lap 245 is 5% to 100% of the width W1 of the reveal portion 242. In some embodiments, the width W2 of the first side lap 245 is 5% to 90% of the width W1 of the reveal portion 242. In some embodiments, the width W2 of the first side lap 245 is 5% to 80% of the width W1 of the reveal portion 242. In some embodiments, the width W2 of the first side lap 245 is 5% to 70% of the width W1 of the reveal portion 242. In some embodiments, the width W2 of the first side lap 245 is 5% to 60% of the width W1 of the reveal portion 242. In some embodiments, the width W2 of the first side lap 245 is 5% to 50% of the width W1 of the reveal portion 242. In some embodiments, the width W2 of the first side lap 245 is 5% to 40% of the width W1 of the reveal portion 242. In some embodiments, the width W2 of the first side lap 245 is 5% to 30% of the width W1 of the reveal portion 242. In some embodiments, the width W2 of the first side lap 245 is 5% to 20% of the width W1 of the reveal portion 242. In some embodiments, the width W2 of the first side lap 245 is 5% to 10% of the width W1 of the reveal portion 242.

In some embodiments, the width W2 of the first side lap 245 is 10% to 150% of the width W1 of the reveal portion 242. In some embodiments, the width W2 of the first side lap 245 is 10% to 140% of the width W1 of the reveal portion 242. In some embodiments, the width W2 of the first side lap 245 is 10% to 130% of the width W1 of the reveal portion 242. In some embodiments, the width W2 of the first side lap 245 is 10% to 120% of the width W1 of the reveal portion 242. In some embodiments, the width W2 of the first side lap 245 is 10% to 110% of the width W1 of the reveal portion 242. In some embodiments, the width W2 of the first side lap 245 is 10% to 100% of the width W1 of the reveal portion 242. In some embodiments, the width W2 of the first side lap 245 is 10% to 90% of the width W1 of the reveal portion 242. In some embodiments, the width W2 of the first side lap 245 is 10% to 80% of the width W1 of the reveal portion 242. In some embodiments, the width W2 of the first side lap 245 is 10% to 70% of the width W1 of the reveal portion 242. In some embodiments, the width W2 of the first side lap 245 is 10% to 60% of the width W1 of the reveal portion 242. In some embodiments, the width W2 of the first side lap 245 is 10% to 50% of the width W1 of the reveal portion 242. In some embodiments, the width W2 of the first side lap 245 is 10% to 40% of the width W1 of the reveal portion 242. In some embodiments, the width W2 of the first side lap 245 is 10% to 30% of the width W1 of the reveal portion 242. In some embodiments, the width W2 of the first side lap 245 is 10% to 20% of the width W1 of the reveal portion 242.

In some embodiments, the width W2 of the first side lap 245 is 20% to 150% of the width W1 of the reveal portion 242. In some embodiments, the width W2 of the first side lap 245 is 20% to 140% of the width W1 of the reveal portion 242. In some embodiments, the width W2 of the first side lap 245 is 20% to 130% of the width W1 of the reveal portion 242. In some embodiments, the width W2 of the first side lap 245 is 20% to 120% of the width W1 of the reveal portion 242. In some embodiments, the width W2 of the first side lap 245 is 20% to 110% of the width W1 of the reveal portion 242. In some embodiments, the width W2 of the first side lap 245 is 20% to 100% of the width W1 of the reveal portion 242. In some embodiments, the width W2 of the first side lap 245 is 20% to 90% of the width W1 of the reveal portion 242. In some embodiments, the width W2 of the first side lap 245 is 20% to 80% of the width W1 of the reveal portion 242. In some embodiments, the width W2 of the first side lap 245 is 20% to 70% of the width W1 of the reveal portion 242. In some embodiments, the width W2 of the first side lap 245 is 20% to 60% of the width W1 of the reveal portion 242. In some embodiments, the width W2 of the first side lap 245 is 20% to 50% of the width W1 of the reveal portion 242. In some embodiments, the width W2 of the first side lap 245 is 20% to 40% of the width W1 of the reveal portion 242. In some embodiments, the width W2 of the first side lap 245 is 20% to 30% of the width W1 of the reveal portion 242.

In some embodiments, the width W2 of the first side lap 245 is 30% to 150% of the width W1 of the reveal portion 242. In some embodiments, the width W2 of the first side lap 245 is 30% to 140% of the width W1 of the reveal portion 242. In some embodiments, the width W2 of the first side lap 245 is 30% to 130% of the width W1 of the reveal portion 242. In some embodiments, the width W2 of the first side lap 245 is 30% to 120% of the width W1 of the reveal portion 242. In some embodiments, the width W2 of the first side lap 245 is 30% to 110% of the width W1 of the reveal portion 242. In some embodiments, the width W2 of the first side lap 245 is 30% to 100% of the width W1 of the reveal portion 242. In some embodiments, the width W2 of the first side lap 245 is 30% to 90% of the width W1 of the reveal portion 242. In some embodiments, the width W2 of the first side lap 245 is 30% to 80% of the width W1 of the reveal portion 242. In some embodiments, the width W2 of the first side lap 245 is 30% to 70% of the width W1 of the reveal portion 242. In some embodiments, the width W2 of the first side lap 245 is 30% to 60% of the width W1 of the reveal portion 242. In some embodiments, the width W2 of the first side lap 245 is 30% to 50% of the width W1 of the reveal portion 242. In some embodiments, the width W2 of the first side lap 245 is 30% to 40% of the width W1 of the reveal portion 242.

In some embodiments, the width W2 of the first side lap 245 is 40% to 150% of the width W1 of the reveal portion 242. In some embodiments, the width W2 of the first side lap 245 is 40% to 140% of the width W1 of the reveal portion 242. In some embodiments, the width W2 of the first side lap 245 is 40% to 130% of the width W1 of the reveal portion 242. In some embodiments, the width W2 of the first side lap 245 is 40% to 120% of the width W1 of the reveal portion 242. In some embodiments, the width W2 of the first side lap 245 is 40% to 110% of the width W1 of the reveal portion 242. In some embodiments, the width W2 of the first side lap 245 is 40% to 100% of the width W1 of the reveal portion 242. In some embodiments, the width W2 of the first side lap 245 is 40% to 90% of the width W1 of the reveal portion 242. In some embodiments, the width W2 of the first side lap 245 is 40% to 80% of the width W1 of the reveal portion 242. In some embodiments, the width W2 of the first side lap 245 is 40% to 70% of the width W1 of the reveal portion 242. In some embodiments, the width W2 of the first side lap 245 is 40% to 60% of the width W1 of the reveal portion 242. In some embodiments, the width W2 of the first side lap 245 is 40% to 50% of the width W1 of the reveal portion 242.

In some embodiments, the width W2 of the first side lap 245 is 50% to 150% of the width W1 of the reveal portion 242. In some embodiments, the width W2 of the first side lap 245 is 50% to 140% of the width W1 of the reveal portion 242. In some embodiments, the width W2 of the first side lap 245 is 50% to 130% of the width W1 of the reveal portion 242. In some embodiments, the width W2 of the first side lap 245 is 50% to 120% of the width W1 of the reveal portion 242. In some embodiments, the width W2 of the first side lap 245 is 50% to 110% of the width W1 of the reveal portion 242. In some embodiments, the width W2 of the first side lap 245 is 50% to 100% of the width W1 of the reveal portion 242. In some embodiments, the width W2 of the first side lap 245 is 50% to 90% of the width W1 of the reveal portion 242. In some embodiments, the width W2 of the first side lap 245 is 50% to 80% of the width W1 of the reveal portion 242. In some embodiments, the width W2 of the first side lap 245 is 50% to 70% of the width W1 of the reveal portion 242. In some embodiments, the width W2 of the first side lap 245 is 50% to 60% of the width W1 of the reveal portion 242.

In some embodiments, the width W2 of the first side lap 245 is 60% to 150% of the width W1 of the reveal portion 242. In some embodiments, the width W2 of the first side lap 245 is 60% to 140% of the width W1 of the reveal portion 242. In some embodiments, the width W2 of the first side lap 245 is 60% to 130% of the width W1 of the reveal portion 242. In some embodiments, the width W2 of the first side lap 245 is 60% to 120% of the width W1 of the reveal portion 242. In some embodiments, the width W2 of the first side lap 245 is 60% to 110% of the width W1 of the reveal portion 242. In some embodiments, the width W2 of the first side lap 245 is 60% to 100% of the width W1 of the reveal portion 242. In some embodiments, the width W2 of the first side lap 245 is 60% to 90% of the width W1 of the reveal portion 242. In some embodiments, the width W2 of the first side lap 245 is 60% to 80% of the width W1 of the reveal portion 242. In some embodiments, the width W2 of the first side lap 245 is 60% to 70% of the width W1 of the reveal portion 242.

In some embodiments, the width W2 of the first side lap 245 is 70% to 150% of the width W1 of the reveal portion 242. In some embodiments, the width W2 of the first side lap 245 is 70% to 140% of the width W1 of the reveal portion 242. In some embodiments, the width W2 of the first side lap 245 is 70% to 130% of the width W1 of the reveal portion 242. In some embodiments, the width W2 of the first side lap 245 is 70% to 120% of the width W1 of the reveal portion 242. In some embodiments, the width W2 of the first side lap 245 is 70% to 110% of the width W1 of the reveal portion 242. In some embodiments, the width W2 of the first side lap 245 is 70% to 100% of the width W1 of the reveal portion 242. In some embodiments, the width W2 of the first side lap 245 is 70% to 90% of the width W1 of the reveal portion 242. In some embodiments, the width W2 of the first side lap 245 is 70% to 80% of the width W1 of the reveal portion 242.

In some embodiments, the width W2 of the first side lap 245 is 80% to 150% of the width W1 of the reveal portion 242. In some embodiments, the width W2 of the first side lap 245 is 80% to 140% of the width W1 of the reveal portion 242. In some embodiments, the width W2 of the first side lap 245 is 80% to 130% of the width W1 of the reveal portion 242. In some embodiments, the width W2 of the first side lap 245 is 80% to 120% of the width W1 of the reveal portion 242. In some embodiments, the width W2 of the first side lap 245 is 80% to 110% of the width W1 of the reveal portion 242. In some embodiments, the width W2 of the first side lap 245 is 80% to 100% of the width W1 of the reveal portion 242. In some embodiments, the width W2 of the first side lap 245 is 80% to 90% of the width W1 of the reveal portion 242.

In some embodiments, the width W2 of the first side lap 245 is 90% to 150% of the width W1 of the reveal portion 242. In some embodiments, the width W2 of the first side lap 245 is 90% to 140% of the width W1 of the reveal portion 242. In some embodiments, the width W2 of the first side lap 245 is 90% to 130% of the width W1 of the reveal portion 242. In some embodiments, the width W2 of the first side lap 245 is 90% to 120% of the width W1 of the reveal portion 242. In some embodiments, the width W2 of the first side lap 245 is 90% to 110% of the width W1 of the reveal portion 242. In some embodiments, the width W2 of the first side lap 245 is 90% to 100% of the width W1 of the reveal portion 242.

In some embodiments, the width W2 of the first side lap 245 is 100% to 150% of the width W1 of the reveal portion 242. In some embodiments, the width W2 of the first side lap 245 is 100% to 140% of the width W1 of the reveal portion 242. In some embodiments, the width W2 of the first side lap 245 is 100% to 130% of the width W1 of the reveal portion 242. In some embodiments, the width W2 of the first side lap 245 is 100% to 120% of the width W1 of the reveal portion 242. In some embodiments, the width W2 of the first side lap 245 is 100% to 110% of the width W1 of the reveal portion 242.

In some embodiments, the width W2 of the first side lap 245 is 110% to 150% of the width W1 of the reveal portion 242. In some embodiments, the width W2 of the first side lap 245 is 110% to 140% of the width W1 of the reveal portion 242. In some embodiments, the width W2 of the first side lap 245 is 110% to 130% of the width W1 of the reveal portion 242. In some embodiments, the width W2 of the first side lap 245 is 110% to 120% of the width W1 of the reveal portion 242.

In some embodiments, the width W2 of the first side lap 245 is 120% to 150% of the width W1 of the reveal portion 242. In some embodiments, the width W2 of the first side lap 245 is 120% to 140% of the width W1 of the reveal portion 242. In some embodiments, the width W2 of the first side lap 245 is 120% to 130% of the width W1 of the reveal portion 242.

In some embodiments, the width W2 of the first side lap 245 is 130% to 150% of the width W1 of the reveal portion 242. In some embodiments, the width W2 of the first side lap 245 is 130% to 140% of the width W1 of the reveal portion 242. In some embodiments, the width W2 of the first side lap 245 is 140% to 150% of the width W1 of the reveal portion 242.

In some embodiments, the width W2 of the first side lap 245 is 5% of the width W1 of the reveal portion 242. In some embodiments, the width W2 of the first side lap 245 is 10% of the width W1 of the reveal portion 242. In some embodiments, the width W2 of the first side lap 245 is 20% of the width W1 of the reveal portion 242. In some embodiments, the width W2 of the first side lap 245 is 30% of the width W1 of the reveal portion 242. In some embodiments, the width W2 of the first side lap 245 is 40% of the width W1 of the reveal portion 242. In some embodiments, the width W2 of the first side lap 245 is 50% of the width W1 of the reveal portion 242. In some embodiments, the width W2 of the first side lap 245 is 60% of the width W1 of the reveal portion 242. In some embodiments, the width W2 of the first side lap 245 is 70% of the width W1 of the reveal portion 242. In some embodiments, the width W2 of the first side lap 245 is 80% of the width W1 of the reveal portion 242. In some embodiments, the width W2 of the first side lap 245 is 90% of the width W1 of the reveal portion 242. In some embodiments, the width W2 of the first side lap 245 is 100% of the width W1 of the reveal portion 242. In some embodiments, the width W2 of the first side lap 245 is 110% of the width W1 of the reveal portion 242. In some embodiments, the width W2 of the first side lap 245 is 120% of the width W1 of the reveal portion 242. In some embodiments, the width W2 of the first side lap 245 is 130% of the width W1 of the reveal portion 242. In some embodiments, the width W2 of the first side lap 245 is 140% of the width W1 of the reveal portion 242. In some embodiments, the width W2 of the first side lap 245 is 150% of the width W1 of the reveal portion 242.

In some embodiments, the width W3 of the second side lap 255 is 5% to 150% of the width W1 of the reveal portion 242. In some embodiments, the width W2 of the second side lap 255 is 5% to 140% of the width W1 of the reveal portion 242. In some embodiments, the width W2 of the second side lap 255 is 5% to 130% of the width W1 of the reveal portion 242. In some embodiments, the width W2 of the second side lap 255 is 5% to 120% of the width W1 of the reveal portion 242. In some embodiments, the width W2 of the second side lap 255 is 5% to 110% of the width W1 of the reveal portion 242. In some embodiments, the width W2 of the second side lap 255 is 5% to 100% of the width W1 of the reveal portion 242. In some embodiments, the width W2 of the second side lap 255 is 5% to 90% of the width W1 of the reveal portion 242. In some embodiments, the width W2 of the second side lap 255 is 5% to 80% of the width W1 of the reveal portion 242. In some embodiments, the width W2 of the second side lap 255 is 5% to 70% of the width W1 of the reveal portion 242. In some embodiments, the width W2 of the second side lap 255 is 5% to 60% of the width W1 of the reveal portion 242. In some embodiments, the width W2 of the second side lap 255 is 5% to 50% of the width W1 of the reveal portion 242. In some embodiments, the width W2 of the second side lap 255 is 5% to 40% of the width W1 of the reveal portion 242. In some embodiments, the width W2 of the second side lap 255 is 5% to 30% of the width W1 of the reveal portion 242. In some embodiments, the width W2 of the second side lap 255 is 5% to 20% of the width W1 of the reveal portion 242. In some embodiments, the width W2 of the second side lap 255 is 5% to 10% of the width W1 of the reveal portion 242.

In some embodiments, the width W2 of the second side lap 255 is 10% to 150% of the width W1 of the reveal portion 242. In some embodiments, the width W2 of the second side lap 255 is 10% to 140% of the width W1 of the reveal portion 242. In some embodiments, the width W2 of the second side lap 255 is 10% to 130% of the width W1 of the reveal portion 242. In some embodiments, the width W2 of the second side lap 255 is 10% to 120% of the width W1 of the reveal portion 242. In some embodiments, the width W2 of the second side lap 255 is 10% to 110% of the width W1 of the reveal portion 242. In some embodiments, the width W2 of the second side lap 255 is 10% to 100% of the width W1 of the reveal portion 242. In some embodiments, the width W2 of the second side lap 255 is 10% to 90% of the width W1 of the reveal portion 242. In some embodiments, the width W2 of the second side lap 255 is 10% to 80% of the width W1 of the reveal portion 242. In some embodiments, the width W2 of the second side lap 255 is 10% to 70% of the width W1 of the reveal portion 242. In some embodiments, the width W2 of the second side lap 255 is 10% to 60% of the width W1 of the reveal portion 242. In some embodiments, the width W2 of the second side lap 255 is 10% to 50% of the width W1 of the reveal portion 242. In some embodiments, the width W2 of the second side lap 255 is 10% to 40% of the width W1 of the reveal portion 242. In some embodiments, the width W2 of the second side lap 255 is 10% to 30% of the width W1 of the reveal portion 242. In some embodiments, the width W2 of the second side lap 255 is 10% to 20% of the width W1 of the reveal portion 242.

In some embodiments, the width W2 of the second side lap 255 is 20% to 150% of the width W1 of the reveal portion 242. In some embodiments, the width W2 of the second side lap 255 is 20% to 140% of the width W1 of the reveal portion 242. In some embodiments, the width W2 of the second side lap 255 is 20% to 130% of the width W1 of the reveal portion 242. In some embodiments, the width W2 of the second side lap 255 is 20% to 120% of the width W1 of the reveal portion 242. In some embodiments, the width W2 of the second side lap 255 is 20% to 110% of the width W1 of the reveal portion 242. In some embodiments, the width W2 of the second side lap 255 is 20% to 100% of the width W1 of the reveal portion 242. In some embodiments, the width W2 of the second side lap 255 is 20% to 90% of the width W1 of the reveal portion 242. In some embodiments, the width W2 of the second side lap 255 is 20% to 80% of the width W1 of the reveal portion 242. In some embodiments, the width W2 of the second side lap 255 is 20% to 70% of the width W1 of the reveal portion 242. In some embodiments, the width W2 of the second side lap 255 is 20% to 60% of the width W1 of the reveal portion 242. In some embodiments, the width W2 of the second side lap 255 is 20% to 50% of the width W1 of the reveal portion 242. In some embodiments, the width W2 of the second side lap 255 is 20% to 40% of the width W1 of the reveal portion 242. In some embodiments, the width W2 of the second side lap 255 is 20% to 30% of the width W1 of the reveal portion 242.

In some embodiments, the width W2 of the second side lap 255 is 30% to 150% of the width W1 of the reveal portion 242. In some embodiments, the width W2 of the second side lap 255 is 30% to 140% of the width W1 of the reveal portion 242. In some embodiments, the width W2 of the second side lap 255 is 30% to 130% of the width W1 of the reveal portion 242. In some embodiments, the width W2 of the second side lap 255 is 30% to 120% of the width W1 of the reveal portion 242. In some embodiments, the width W2 of the second side lap 255 is 30% to 110% of the width W1 of the reveal portion 242. In some embodiments, the width W2 of the second side lap 255 is 30% to 100% of the width W1 of the reveal portion 242. In some embodiments, the width W2 of the second side lap 255 is 30% to 90% of the width W1 of the reveal portion 242. In some embodiments, the width W2 of the second side lap 255 is 30% to 80% of the width W1 of the reveal portion 242. In some embodiments, the width W2 of the second side lap 255 is 30% to 70% of the width W1 of the reveal portion 242. In some embodiments, the width W2 of the second side lap 255 is 30% to 60% of the width W1 of the reveal portion 242. In some embodiments, the width W2 of the second side lap 255 is 30% to 50% of the width W1 of the reveal portion 242. In some embodiments, the width W2 of the second side lap 255 is 30% to 40% of the width W1 of the reveal portion 242.

In some embodiments, the width W2 of the second side lap 255 is 40% to 150% of the width W1 of the reveal portion 242. In some embodiments, the width W2 of the second side lap 255 is 40% to 140% of the width W1 of the reveal portion 242. In some embodiments, the width W2 of the second side lap 255 is 40% to 130% of the width W1 of the reveal portion 242. In some embodiments, the width W2 of the second side lap 255 is 40% to 120% of the width W1 of the reveal portion 242. In some embodiments, the width W2 of the second side lap 255 is 40% to 110% of the width W1 of the reveal portion 242. In some embodiments, the width W2 of the second side lap 255 is 40% to 100% of the width W1 of the reveal portion 242. In some embodiments, the width W2 of the second side lap 255 is 40% to 90% of the width W1 of the reveal portion 242. In some embodiments, the width W2 of the second side lap 255 is 40% to 80% of the width W1 of the reveal portion 242. In some embodiments, the width W2 of the second side lap 255 is 40% to 70% of the width W1 of the reveal portion 242. In some embodiments, the width W2 of the second side lap 255 is 40% to 60% of the width W1 of the reveal portion 242. In some embodiments, the width W2 of the second side lap 255 is 40% to 50% of the width W1 of the reveal portion 242.

In some embodiments, the width W2 of the second side lap 255 is 50% to 150% of the width W1 of the reveal portion 242. In some embodiments, the width W2 of the second side lap 255 is 50% to 140% of the width W1 of the reveal portion 242. In some embodiments, the width W2 of the second side lap 255 is 50% to 130% of the width W1 of the reveal portion 242. In some embodiments, the width W2 of the second side lap 255 is 50% to 120% of the width W1 of the reveal portion 242. In some embodiments, the width W2 of the second side lap 255 is 50% to 110% of the width W1 of the reveal portion 242. In some embodiments, the width W2 of the second side lap 255 is 50% to 100% of the width W1 of the reveal portion 242. In some embodiments, the width W2 of the second side lap 255 is 50% to 90% of the width W1 of the reveal portion 242. In some embodiments, the width W2 of the second side lap 255 is 50% to 80% of the width W1 of the reveal portion 242. In some embodiments, the width W2 of the second side lap 255 is 50% to 70% of the width W1 of the reveal portion 242. In some embodiments, the width W2 of the second side lap 255 is 50% to 60% of the width W1 of the reveal portion 242.

In some embodiments, the width W2 of the second side lap 255 is 60% to 150% of the width W1 of the reveal portion 242. In some embodiments, the width W2 of the second side lap 255 is 60% to 140% of the width W1 of the reveal portion 242. In some embodiments, the width W2 of the second side lap 255 is 60% to 130% of the width W1 of the reveal portion 242. In some embodiments, the width W2 of the second side lap 255 is 60% to 120% of the width W1 of the reveal portion 242. In some embodiments, the width W2 of the second side lap 255 is 60% to 110% of the width W1 of the reveal portion 242. In some embodiments, the width W2 of the second side lap 255 is 60% to 100% of the width W1 of the reveal portion 242. In some embodiments, the width W2 of the second side lap 255 is 60% to 90% of the width W1 of the reveal portion 242. In some embodiments, the width W2 of the second side lap 255 is 60% to 80% of the width W1 of the reveal portion 242. In some embodiments, the width W2 of the second side lap 255 is 60% to 70% of the width W1 of the reveal portion 242.

In some embodiments, the width W2 of the second side lap 255 is 70% to 150% of the width W1 of the reveal portion 242. In some embodiments, the width W2 of the second side lap 255 is 70% to 140% of the width W1 of the reveal portion 242. In some embodiments, the width W2 of the second side lap 255 is 70% to 130% of the width W1 of the reveal portion 242. In some embodiments, the width W2 of the second side lap 255 is 70% to 120% of the width W1 of the reveal portion 242. In some embodiments, the width W2 of the second side lap 255 is 70% to 110% of the width W1 of the reveal portion 242. In some embodiments, the width W2 of the second side lap 255 is 70% to 100% of the width W1 of the reveal portion 242. In some embodiments, the width W2 of the second side lap 255 is 70% to 90% of the width W1 of the reveal portion 242. In some embodiments, the width W2 of the second side lap 255 is 70% to 80% of the width W1 of the reveal portion 242.

In some embodiments, the width W2 of the second side lap 255 is 80% to 150% of the width W1 of the reveal portion 242. In some embodiments, the width W2 of the second side lap 255 is 80% to 140% of the width W1 of the reveal portion 242. In some embodiments, the width W2 of the second side lap 255 is 80% to 130% of the width W1 of the reveal portion 242. In some embodiments, the width W2 of the second side lap 255 is 80% to 120% of the width W1 of the reveal portion 242. In some embodiments, the width W2 of the second side lap 255 is 80% to 110% of the width W1 of the reveal portion 242. In some embodiments, the width W2 of the second side lap 255 is 80% to 100% of the width W1 of the reveal portion 242. In some embodiments, the width W2 of the second side lap 255 is 80% to 90% of the width W1 of the reveal portion 242.

In some embodiments, the width W2 of the second side lap 255 is 90% to 150% of the width W1 of the reveal portion 242. In some embodiments, the width W2 of the second side lap 255 is 90% to 140% of the width W1 of the reveal portion 242. In some embodiments, the width W2 of the second side lap 255 is 90% to 130% of the width W1 of the reveal portion 242. In some embodiments, the width W2 of the second side lap 255 is 90% to 120% of the width W1 of the reveal portion 242. In some embodiments, the width W2 of the second side lap 255 is 90% to 110% of the width W1 of the reveal portion 242. In some embodiments, the width W2 of the second side lap 255 is 90% to 100% of the width W1 of the reveal portion 242.

In some embodiments, the width W2 of the second side lap 255 is 100% to 150% of the width W1 of the reveal portion 242. In some embodiments, the width W2 of the second side lap 255 is 100% to 140% of the width W1 of the reveal portion 242. In some embodiments, the width W2 of the second side lap 255 is 100% to 130% of the width W1 of the reveal portion 242. In some embodiments, the width W2 of the second side lap 255 is 100% to 120% of the width W1 of the reveal portion 242. In some embodiments, the width W2 of the second side lap 255 is 100% to 110% of the width W1 of the reveal portion 242.

In some embodiments, the width W2 of the second side lap 255 is 110% to 150% of the width W1 of the reveal portion 242. In some embodiments, the width W2 of the second side lap 255 is 110% to 140% of the width W1 of the reveal portion 242. In some embodiments, the width W2 of the second side lap 255 is 110% to 130% of the width W1 of the reveal portion 242. In some embodiments, the width W2 of the second side lap 255 is 110% to 120% of the width W1 of the reveal portion 242.

In some embodiments, the width W2 of the second side lap 255 is 120% to 150% of the width W1 of the reveal portion 242. In some embodiments, the width W2 of the second side lap 255 is 120% to 140% of the width W1 of the reveal portion 242. In some embodiments, the width W2 of the second side lap 255 is 120% to 130% of the width W1 of the reveal portion 242.

In some embodiments, the width W2 of the second side lap 255 is 130% to 150% of the width W1 of the reveal portion 242. In some embodiments, the width W2 of the second side lap 255 is 130% to 140% of the width W1 of the reveal portion 242. In some embodiments, the width W2 of the second side lap 255 is 140% to 150% of the width W1 of the reveal portion 242.

In some embodiments, the width W2 of the second side lap 255 is 5% of the width W1 of the reveal portion 242. In some embodiments, the width W2 of the second side lap 255 is 10% of the width W1 of the reveal portion 242. In some embodiments, the width W2 of the second side lap 255 is 20% of the width W1 of the reveal portion 242. In some embodiments, the width W2 of the second side lap 255 is 30% of the width W1 of the reveal portion 242. In some embodiments, the width W2 of the second side lap 255 is 40% of the width W1 of the reveal portion 242. In some embodiments, the width W2 of the second side lap 255 is 50% of the width W1 of the reveal portion 242. In some embodiments, the width W2 of the second side lap 255 is 60% of the width W1 of the reveal portion 242. In some embodiments, the width W2 of the second side lap 255 is 70% of the width W1 of the reveal portion 242. In some embodiments, the width W2 of the second side lap 255 is 80% of the width W1 of the reveal portion 242. In some embodiments, the width W2 of the second side lap 255 is 90% of the width W1 of the reveal portion 242. In some embodiments, the width W2 of the second side lap 255 is 100% of the width W1 of the reveal portion 242. In some embodiments, the width W2 of the second side lap 255 is 110% of the width W1 of the reveal portion 242. In some embodiments, the width W2 of the second side lap 255 is 120% of the width W1 of the reveal portion 242. In some embodiments, the width W2 of the second side lap 255 is 130% of the width W1 of the reveal portion 242. In some embodiments, the width W2 of the second side lap 255 is 140% of the width W1 of the reveal portion 242. In some embodiments, the width W2 of the second side lap 255 is 150% of the width W1 of the reveal portion 242.

Figure 8:
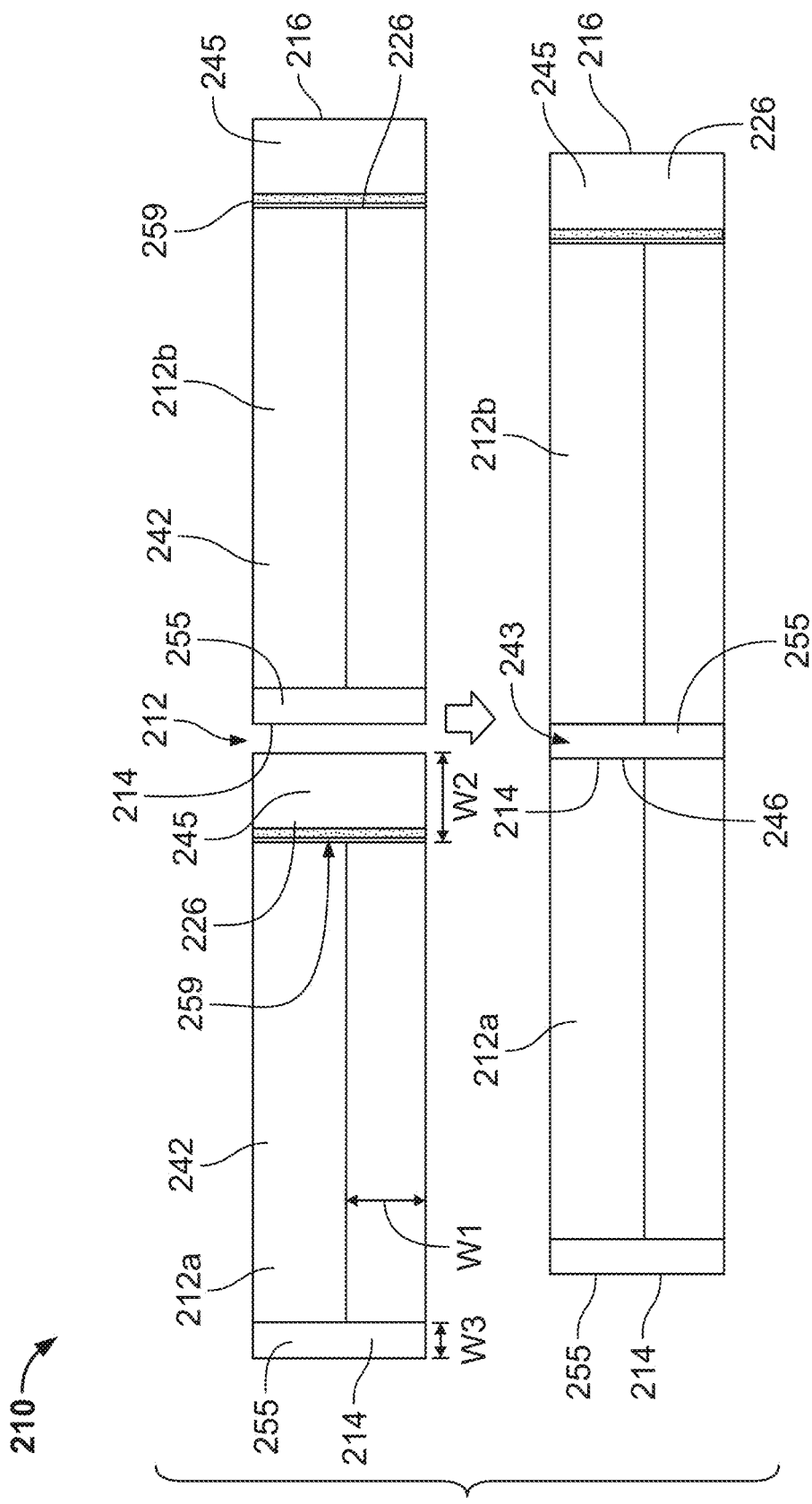
FIG. 8 is a top plan view of an embodiment of a system including a plurality of photovoltaic shingles.

Still referring to FIGS. 7 and 8, in some embodiments, the first end 214 of the second photovoltaic shingle 212b overlays the first side lap 245 of the first photovoltaic shingle 212a. In some embodiments, the first end 214 of the second photovoltaic shingle 212b is adhered to the first side lap 245 of the first photovoltaic shingle 212a. In some embodiments, a head lap 222 of the first photovoltaic shingle 212a and a head lap 222 of the second photovoltaic shingle 212b form a sealed portion 243 with a seam 246 therebetween. In some embodiments, the overlayment and adherence of the second photovoltaic shingle 212b over the first photovoltaic shingle 212a is configured to shed and redirect water away from the seam 246. In some embodiments, the width of the overlay of the first end 214 of the second photovoltaic shingle 212b over the first side lap 245 of the first photovoltaic shingle 212a is from approximately equal to the width W3 of the second side lap 255 to approximately equal to the width W2 of the first side lap 245.

Figure 9:
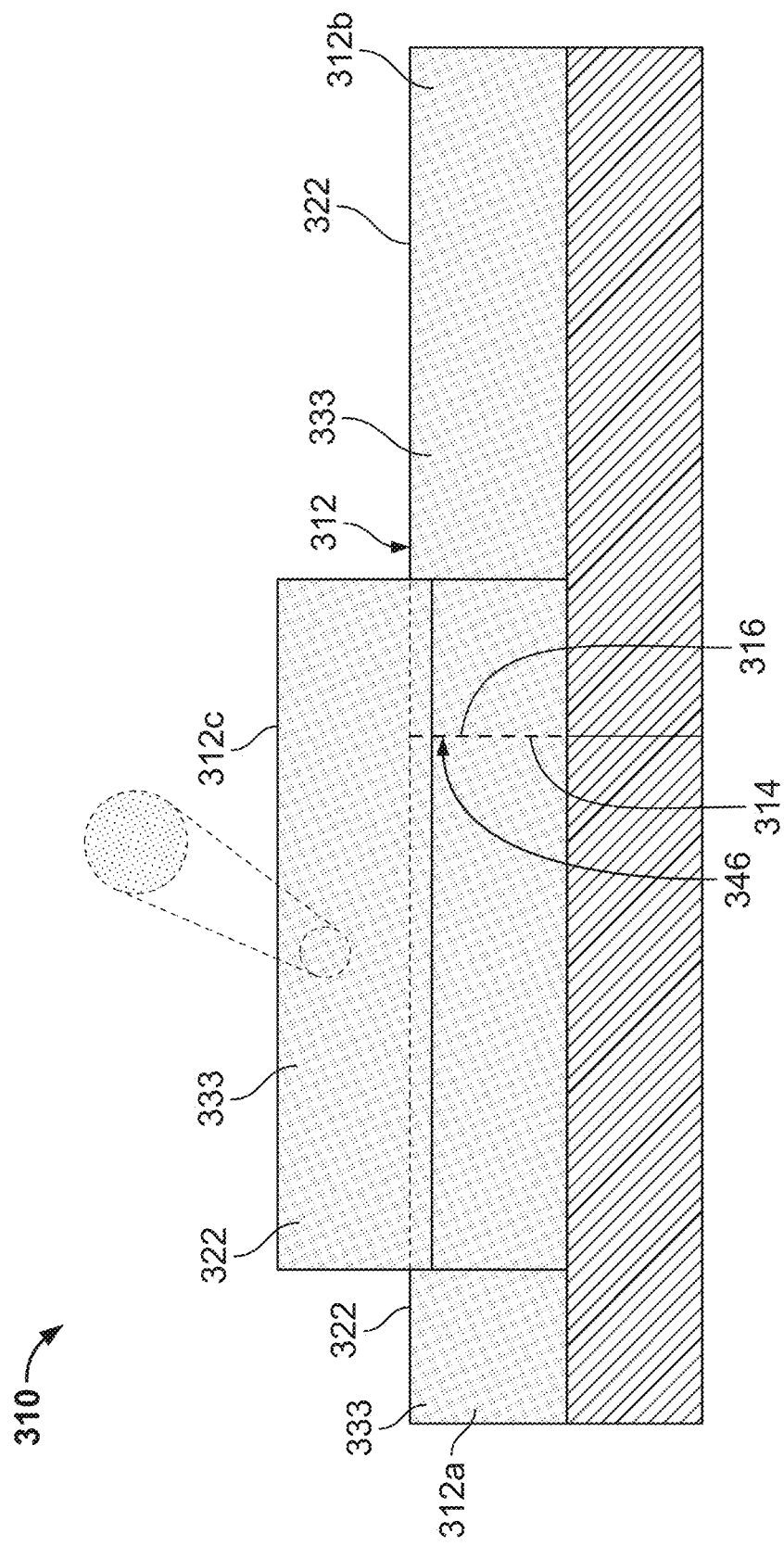
FIG. 9 is a top plan view of an embodiment of a system including a plurality of photovoltaic shingles.

Referring to FIG. 9, in some embodiments, a system 310 includes a plurality of roofing shingles 312. In some embodiments, the plurality of roofing shingles 312 includes a first photovoltaic shingle 312a and a second photovoltaic shingle 312b. In some embodiments, the roofing shingles 312 include a similar structure and function as the roofing shingles 12, except as provided as follows.

Figure 11:
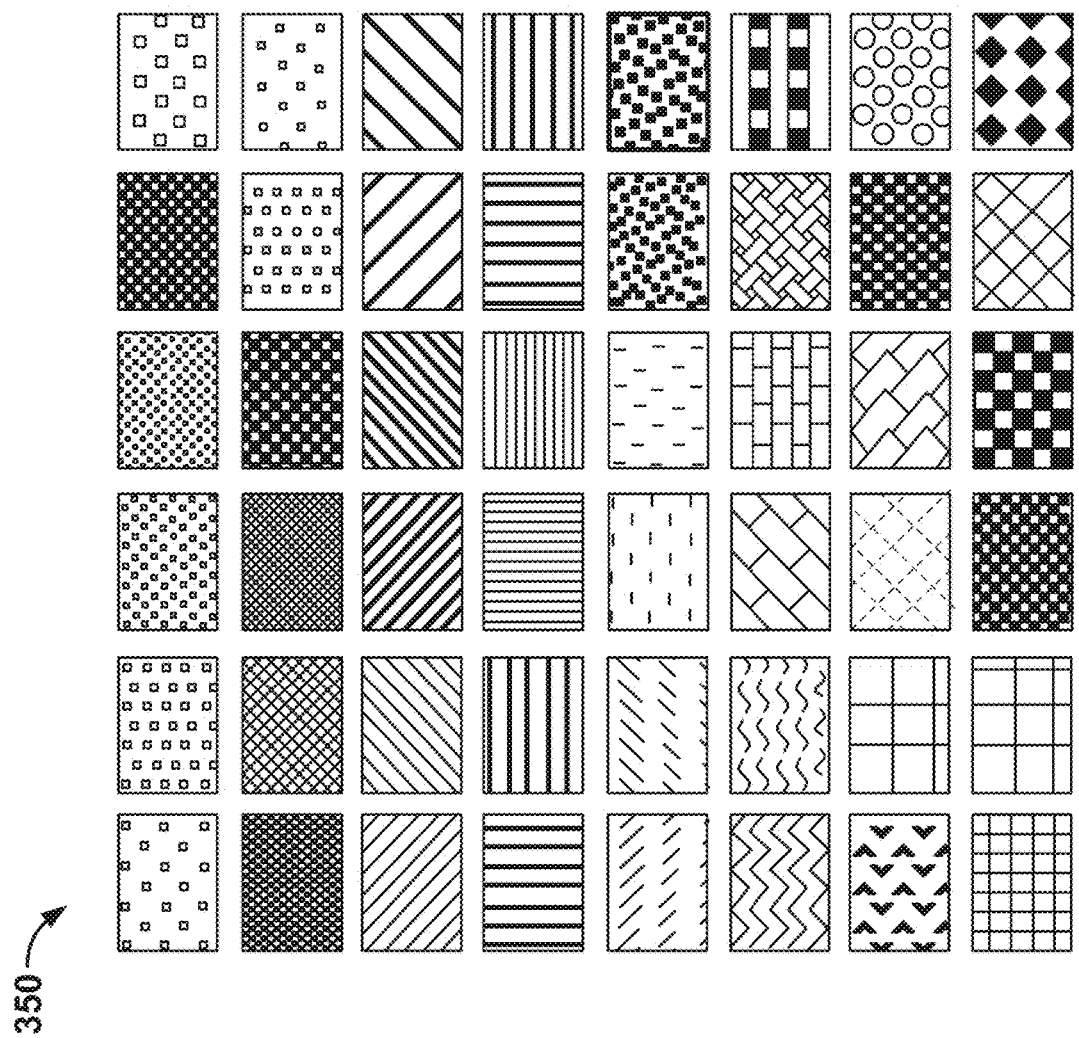
FIG. 11 illustrates embodiments of embossing patterns of side laps employed by the photovoltaic shingles of FIGS. 9 and 10.

In some embodiments, each of the roofing shingles 312 includes a head lap 322 having a textured surface 333. In some embodiments, the textured surface 333 includes a plurality of raised surfaces. In some embodiments, the textured surface 333 includes a plurality of embossments. In some embodiments, the plurality of raised surfaces are formed in a pattern. In some embodiments, the pattern is selected from, but not limited to, one or more of patterns 350 shown in FIG. 11.

In some embodiments, the textured surface 333 includes a surface roughness (Ra) equal to or less than the surface roughness of a head lap area of an asphalt shingle. In some embodiments, the textured surface 333 includes a surface roughness (Ra) of 1 micron to 15 microns. In another embodiment, the textured surface 333 includes a surface roughness (Ra) of 1 micron to 14 microns. In another embodiment, the textured surface 333 includes a surface roughness (Ra) of 1 micron to 13 microns. In another embodiment, the textured surface 333 includes a surface roughness (Ra) of 1 micron to 12 microns. In another embodiment, the textured surface 333 includes a surface roughness (Ra) of 1 micron to 11 microns. In another embodiment, the textured surface 333 includes a surface roughness (Ra) of 1 micron to 10 microns. In another embodiment, the textured surface 333 includes a surface roughness (Ra) of 1 micron to 9 microns. In another embodiment, the textured surface 333 includes a surface roughness (Ra) of 1 micron to 8 microns. In another embodiment, the textured surface 333 includes a surface roughness (Ra) of 1 micron to 7 microns. In another embodiment, the textured surface 333 includes a surface roughness (Ra) of 1 micron to 6 microns. In another embodiment, the textured surface 333 includes a surface roughness (Ra) of 1 micron to 5 microns. In another embodiment, the textured surface 333 includes a surface roughness (Ra) of 1 micron to 4 microns. In another embodiment, the textured surface 333 includes a surface roughness (Ra) of 1 micron to 3 microns. In another embodiment, the textured surface 333 includes a surface roughness (Ra) of 1 micron to 2 microns.

In some embodiments, the textured surface 333 includes a surface roughness (Ra) of 2 microns to 15 microns. In another embodiment, the textured surface 333 includes a surface roughness (Ra) of 2 microns to 14 microns. In another embodiment, the textured surface 333 includes a surface roughness (Ra) of 2 microns to 13 microns. In another embodiment, the textured surface 333 includes a surface roughness (Ra) of 2 microns to 12 microns. In another embodiment, the textured surface 333 includes a surface roughness (Ra) of 2 microns to 11 microns. In another embodiment, the textured surface 333 includes a surface roughness (Ra) of 2 microns to 10 microns. In another embodiment, the textured surface 333 includes a surface roughness (Ra) of 2 microns to 9 microns. In another embodiment, the textured surface 333 includes a surface roughness (Ra) of 2 microns to 8 microns. In another embodiment, the textured surface 333 includes a surface roughness (Ra) of 2 microns to 7 microns. In another embodiment, the textured surface 333 includes a surface roughness (Ra) of 2 microns to 6 microns. In another embodiment, the textured surface 333 includes a surface roughness (Ra) of 2 microns to 5 microns. In another embodiment, the textured surface 333 includes a surface roughness (Ra) of 2 microns to 4 microns. In another embodiment, the textured surface 333 includes a surface roughness (Ra) of 2 microns to 3 microns.

In some embodiments, the textured surface 333 includes a surface roughness (Ra) of 3 microns to 15 microns. In another embodiment, the textured surface 333 includes a surface roughness (Ra) of 3 microns to 14 microns. In another embodiment, the textured surface 333 includes a surface roughness (Ra) of 3 microns to 13 microns. In another embodiment, the textured surface 333 includes a surface roughness (Ra) of 3 microns to 12 microns. In another embodiment, the textured surface 333 includes a surface roughness (Ra) of 3 microns to 11 microns. In another embodiment, the textured surface 333 includes a surface roughness (Ra) of 3 microns to 10 microns. In another embodiment, the textured surface 333 includes a surface roughness (Ra) of 3 microns to 9 microns. In another embodiment, the textured surface 333 includes a surface roughness (Ra) of 3 microns to 8 microns. In another embodiment, the textured surface 333 includes a surface roughness (Ra) of 3 microns to 7 microns. In another embodiment, the textured surface 333 includes a surface roughness (Ra) of 3 microns to 6 microns. In another embodiment, the textured surface 333 includes a surface roughness (Ra) of 3 microns to 5 microns. In another embodiment, the textured surface 333 includes a surface roughness (Ra) of 3 microns to 4 microns.

In some embodiments, the textured surface 333 includes a surface roughness (Ra) of 4 microns to 15 microns. In another embodiment, the textured surface 333 includes a surface roughness (Ra) of 4 microns to 14 microns. In another embodiment, the textured surface 333 includes a surface roughness (Ra) of 4 microns to 13 microns. In another embodiment, the textured surface 333 includes a surface roughness (Ra) of 4 microns to 12 microns. In another embodiment, the textured surface 333 includes a surface roughness (Ra) of 4 microns to 11 microns. In another embodiment, the textured surface 333 includes a surface roughness (Ra) of 4 microns to 10 microns. In another embodiment, the textured surface 333 includes a surface roughness (Ra) of 4 microns to 9 microns. In another embodiment, the textured surface 333 includes a surface roughness (Ra) of 4 microns to 8 microns. In another embodiment, the textured surface 333 includes a surface roughness (Ra) of 4 microns to 7 microns. In another embodiment, the textured surface 333 includes a surface roughness (Ra) of 4 microns to 6 microns. In another embodiment, the textured surface 333 includes a surface roughness (Ra) of 4 microns to 5 microns.

In some embodiments, the textured surface 333 includes a surface roughness (Ra) of 5 microns to 15 microns. In another embodiment, the textured surface 333 includes a surface roughness (Ra) of 5 microns to 14 microns. In another embodiment, the textured surface 333 includes a surface roughness (Ra) of 5 microns to 13 microns. In another embodiment, the textured surface 333 includes a surface roughness (Ra) of 5 microns to 12 microns. In another embodiment, the textured surface 333 includes a surface roughness (Ra) of 5 microns to 11 microns. In another embodiment, the textured surface 333 includes a surface roughness (Ra) of 5 microns to 10 microns. In another embodiment, the textured surface 333 includes a surface roughness (Ra) of 5 microns to 9 microns. In another embodiment, the textured surface 333 includes a surface roughness (Ra) of 5 microns to 8 microns. In another embodiment, the textured surface 333 includes a surface roughness (Ra) of 5 microns to 7 microns. In another embodiment, the textured surface 333 includes a surface roughness (Ra) of 5 microns to 6 microns.

In some embodiments, the textured surface 333 includes a surface roughness (Ra) of 6 microns to 15 microns. In another embodiment, the textured surface 333 includes a surface roughness (Ra) of 6 microns to 14 microns. In another embodiment, the textured surface 333 includes a surface roughness (Ra) of 6 microns to 13 microns. In another embodiment, the textured surface 333 includes a surface roughness (Ra) of 6 microns to 12 microns. In another embodiment, the textured surface 333 includes a surface roughness (Ra) of 6 microns to 11 microns. In another embodiment, the textured surface 333 includes a surface roughness (Ra) of 6 microns to 10 microns. In another embodiment, the textured surface 333 includes a surface roughness (Ra) of 6 microns to 9 microns. In another embodiment, the textured surface 333 includes a surface roughness (Ra) of 6 microns to 8 microns. In another embodiment, the textured surface 333 includes a surface roughness (Ra) of 6 microns to 7 microns.

In some embodiments, the textured surface 333 includes a surface roughness (Ra) of 7 microns to 15 microns. In another embodiment, the textured surface 333 includes a surface roughness (Ra) of 7 microns to 14 microns. In another embodiment, the textured surface 333 includes a surface roughness (Ra) of 7 microns to 13 microns. In another embodiment, the textured surface 333 includes a surface roughness (Ra) of 7 microns to 12 microns. In another embodiment, the textured surface 333 includes a surface roughness (Ra) of 7 microns to 11 microns. In another embodiment, the textured surface 333 includes a surface roughness (Ra) of 7 microns to 10 microns. In another embodiment, the textured surface 333 includes a surface roughness (Ra) of 7 microns to 9 microns. In another embodiment, the textured surface 333 includes a surface roughness (Ra) of 7 microns to 8 microns.

In some embodiments, the textured surface 333 includes a surface roughness (Ra) of 8 microns to 15 microns. In another embodiment, the textured surface 333 includes a surface roughness (Ra) of 8 microns to 14 microns. In another embodiment, the textured surface 333 includes a surface roughness (Ra) of 8 microns to 13 microns. In another embodiment, the textured surface 333 includes a surface roughness (Ra) of 8 microns to 12 microns. In another embodiment, the textured surface 333 includes a surface roughness (Ra) of 8 microns to 11 microns. In another embodiment, the textured surface 333 includes a surface roughness (Ra) of 8 microns to 10 microns. In another embodiment, the textured surface 333 includes a surface roughness (Ra) of 8 microns to 9 microns.

In some embodiments, the textured surface 333 includes a surface roughness (Ra) of 9 microns to 15 microns. In another embodiment, the textured surface 333 includes a surface roughness (Ra) of 9 microns to 14 microns. In another embodiment, the textured surface 333 includes a surface roughness (Ra) of 9 microns to 13 microns. In another embodiment, the textured surface 333 includes a surface roughness (Ra) of 9 microns to 12 microns. In another embodiment, the textured surface 333 includes a surface roughness (Ra) of 9 microns to 11 microns. In another embodiment, the textured surface 333 includes a surface roughness (Ra) of 9 microns to 10 microns.

In some embodiments, the textured surface 333 includes a surface roughness (Ra) of 10 microns to 15 microns. In another embodiment, the textured surface 333 includes a surface roughness (Ra) of 10 microns to 14 microns. In another embodiment, the textured surface 333 includes a surface roughness (Ra) of 10 microns to 13 microns. In another embodiment, the textured surface 333 includes a surface roughness (Ra) of 10 microns to 12 microns. In another embodiment, the textured surface 333 includes a surface roughness (Ra) of 10 microns to 11 microns.

In some embodiments, the textured surface 333 includes a surface roughness (Ra) of 11 microns to 15 microns. In another embodiment, the textured surface 333 includes a surface roughness (Ra) of 11 microns to 14 microns. In another embodiment, the textured surface 333 includes a surface roughness (Ra) of 11 microns to 13 microns. In another embodiment, the textured surface 333 includes a surface roughness (Ra) of 11 microns to 12 microns.

In some embodiments, the textured surface 333 includes a surface roughness (Ra) of 12 microns to 15 microns. In another embodiment, the textured surface 333 includes a surface roughness (Ra) of 12 microns to 14 microns. In another embodiment, the textured surface 333 includes a surface roughness (Ra) of 12 microns to 13 microns. In some embodiments, the textured surface 333 includes a surface roughness (Ra) of 13 microns to 15 microns. In another embodiment, the textured surface 333 includes a surface roughness (Ra) of 13 microns to 14 microns. In some embodiments, the textured surface 333 includes a surface roughness (Ra) of 14 microns to 15 microns.

In some embodiments, the textured surface 333 includes a surface roughness (Ra) of 1 micron. In some embodiments, the textured surface 333 includes a surface roughness (Ra) of 2 microns. In some embodiments, the textured surface 333 includes a surface roughness (Ra) of 3 microns. In some embodiments, the textured surface 333 includes a surface roughness (Ra) of 4 microns. In some embodiments, the textured surface 333 includes a surface roughness (Ra) of 5 microns. In some embodiments, the textured surface 333 includes a surface roughness (Ra) of 6 microns. In some embodiments, the textured surface 333 includes a surface roughness (Ra) of 7 microns. In some embodiments, the textured surface 333 includes a surface roughness (Ra) of 8 microns. In some embodiments, the textured surface 333 includes a surface roughness (Ra) of 9 microns. In some embodiments, the textured surface 333 includes a surface roughness (Ra) of 10 microns. In some embodiments, the textured surface 333 includes a surface roughness (Ra) of 11 microns. In some embodiments, the textured surface 333 includes a surface roughness (Ra) of 12 microns. In some embodiments, the textured surface 333 includes a surface roughness (Ra) of 13 microns. In some embodiments, the textured surface 333 includes a surface roughness (Ra) of 14 microns. In some embodiments, the textured surface 333 includes a surface roughness (Ra) of 15 microns.

In some embodiments, a first end 314 of the second photovoltaic shingle 312b is adjacent to a second end 316 of the first photovoltaic shingle 312a. In some embodiments, the head lap 322 of the first photovoltaic shingle 312a and the head lap 322 of the second photovoltaic shingle 312b form a seam 346 therebetween. In some embodiments, a third photovoltaic shingle 312c overlays the first photovoltaic shingle 312a and the second photovoltaic shingle 312b. In some embodiments, the textured surface 333 is configured to shed and inhibit water from entering the seam 346.

Figure 12A:
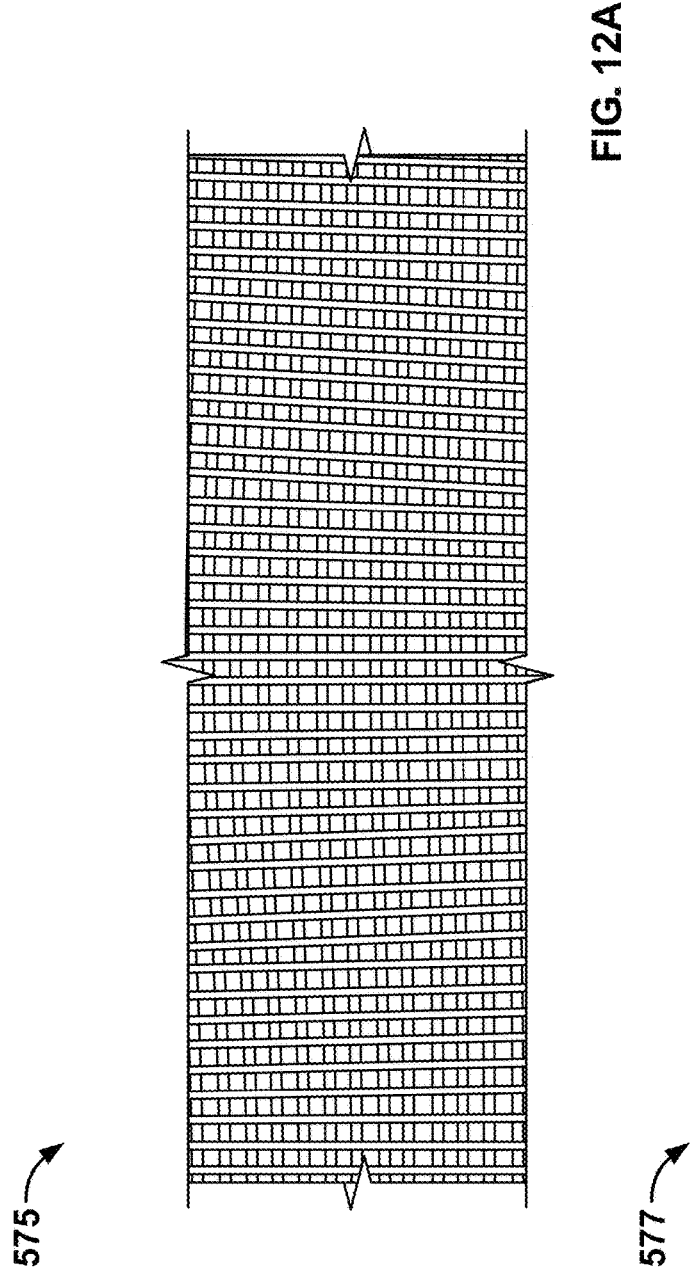
FIGS. 12A and 12B are illustrations of embodiments of scrims employed by the photovoltaic shingles of FIGS. 9 and 10.
Figure 12B:
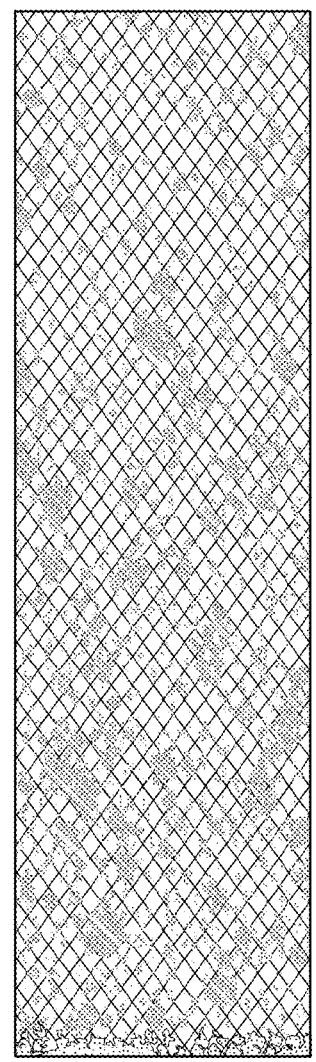

In another embodiment, textured surface 433 of the head lap 322 includes a scrim. In some embodiments, the scrim is composed of a sheet of mesh material, such as, but not limited to, the mesh materials 575, 577 shown in FIGS. 12A and 12B. In some embodiments, the scrim is composed of a sheet of mesh material. In some embodiments, the scrim includes fiberglass mesh. In some embodiments, the scrim includes a carbon fiber composite. In another embodiment, the scrim include a polymer. In some embodiments, the scrim includes a textile material. In some embodiments, the scrim is laminated with the head lap 322. In another embodiment, the scrim is attached to the head lap 322 by an adhesive. In another embodiment, the scrim is thermally bonded to the head lap 322. In another embodiment, the scrim is located on a second surface opposite the textured surface 333. In some embodiments, the scrim is configured to prevent water from wicking between overlapping and/or adjacent ones of the roofing shingles 312. In another embodiment, the head lap 322 includes a scrim located on a surface thereof.

Figure 10:
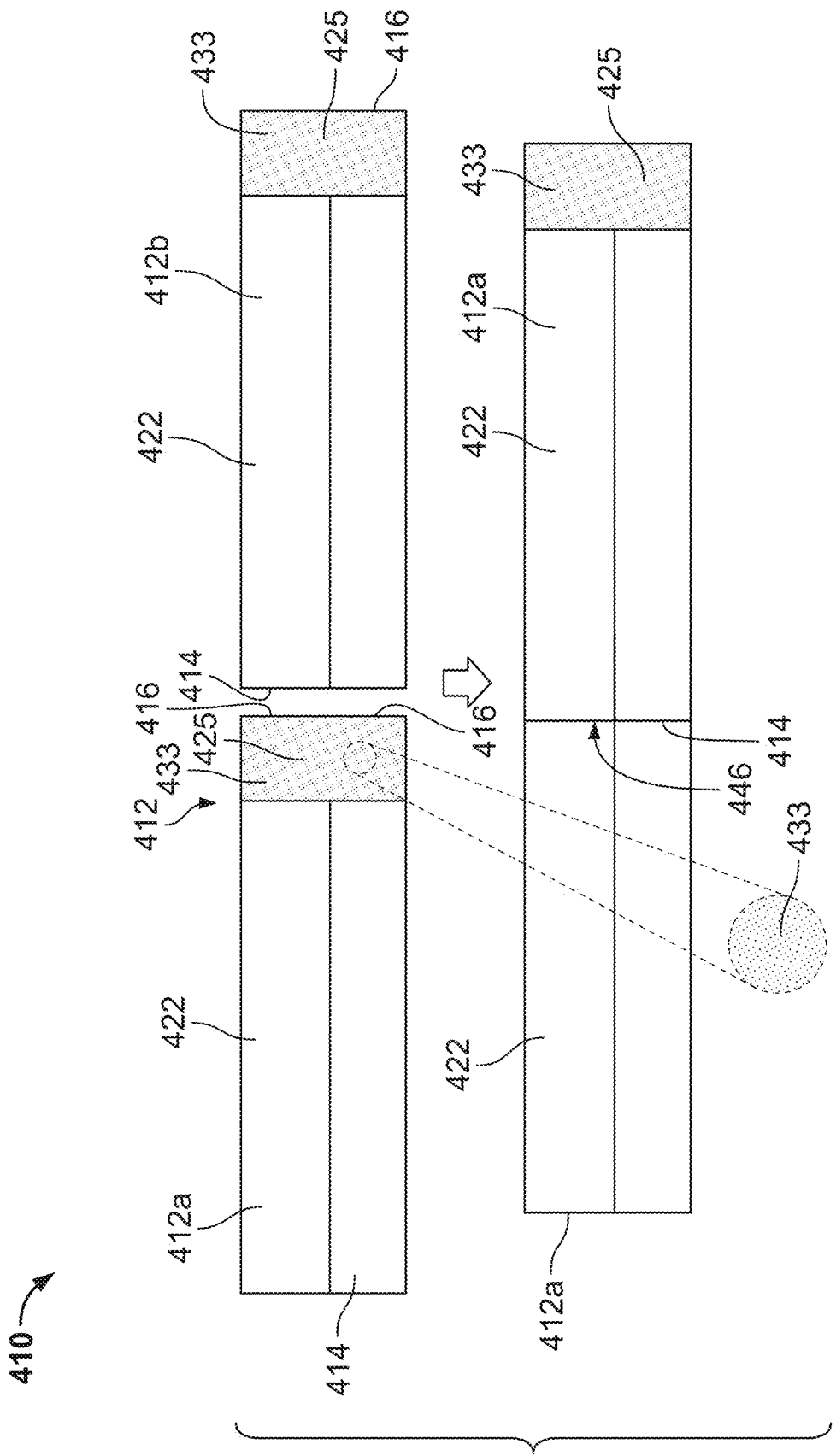
FIG. 10 is a top plan view of an embodiment of a system including a plurality of photovoltaic shingles.

Referring to FIG. 10, in some embodiments, a system 410 includes a plurality of roofing shingles 412. In some embodiments, the plurality of roofing shingles 412 includes a first photovoltaic shingle 412a and a second photovoltaic shingle 412b. In some embodiments, the roofing shingles 412 include a similar structure and function as the roofing shingles 112, except as provided as follows.

In some embodiments, each of the roofing shingles 412 includes a side lap 425 located at a second end 416 thereof. In some embodiments, the side lap 425 includes a textured surface 433. In some embodiments, the textured surface 433 includes a plurality of raised surfaces. In some embodiments, the textured surface 433 includes a plurality of embossments. In some embodiments, the plurality of raised surfaces is formed in a pattern. In some embodiments, the pattern is selected from, but not limited to, one or more of patterns 350 shown in FIG. 11.

In some embodiments, the textured surface 433 includes a surface roughness (Ra) equal to or less than the surface roughness of the head lap area of an asphalt shingle. In some embodiments, the textured surface 433 includes a surface roughness (Ra) of 1 micron to 15 microns. In another embodiment, the textured surface 433 includes a surface roughness (Ra) of 1 micron to 14 microns. In another embodiment, the textured surface 433 includes a surface roughness (Ra) of 1 micron to 13 microns. In another embodiment, the textured surface 433 includes a surface roughness (Ra) of 1 micron to 12 microns. In another embodiment, the textured surface 433 includes a surface roughness (Ra) of 1 micron to 11 microns. In another embodiment, the textured surface 433 includes a surface roughness (Ra) of 1 micron to 10 microns. In another embodiment, the textured surface 433 includes a surface roughness (Ra) of 1 micron to 9 microns. In another embodiment, the textured surface 433 includes a surface roughness (Ra) of 1 micron to 8 microns. In another embodiment, the textured surface 433 includes a surface roughness (Ra) of 1 micron to 7 microns. In another embodiment, the textured surface 433 includes a surface roughness (Ra) of 1 micron to 6 microns. In another embodiment, the textured surface 433 includes a surface roughness (Ra) of 1 micron to 5 microns. In another embodiment, the textured surface 433 includes a surface roughness (Ra) of 1 micron to 4 microns. In another embodiment, the textured surface 433 includes a surface roughness (Ra) of 1 micron to 3 microns. In another embodiment, the textured surface 433 includes a surface roughness (Ra) of 1 micron to 2 microns.

In some embodiments, the textured surface 433 includes a surface roughness (Ra) of 2 microns to 15 microns. In another embodiment, the textured surface 433 includes a surface roughness (Ra) of 2 microns to 14 microns. In another embodiment, the textured surface 433 includes a surface roughness (Ra) of 2 microns to 13 microns. In another embodiment, the textured surface 433 includes a surface roughness (Ra) of 2 microns to 12 microns. In another embodiment, the textured surface 433 includes a surface roughness (Ra) of 2 microns to 11 microns. In another embodiment, the textured surface 433 includes a surface roughness (Ra) of 2 microns to 10 microns. In another embodiment, the textured surface 433 includes a surface roughness (Ra) of 2 microns to 9 microns. In another embodiment, the textured surface 433 includes a surface roughness (Ra) of 2 microns to 8 microns. In another embodiment, the textured surface 433 includes a surface roughness (Ra) of 2 microns to 7 microns. In another embodiment, the textured surface 433 includes a surface roughness (Ra) of 2 microns to 6 microns. In another embodiment, the textured surface 433 includes a surface roughness (Ra) of 2 microns to 5 microns. In another embodiment, the textured surface 433 includes a surface roughness (Ra) of 2 microns to 4 microns. In another embodiment, the textured surface 433 includes a surface roughness (Ra) of 2 microns to 3 microns.

In some embodiments, the textured surface 433 includes a surface roughness (Ra) of 3 microns to 15 microns. In another embodiment, the textured surface 433 includes a surface roughness (Ra) of 3 microns to 14 microns. In another embodiment, the textured surface 433 includes a surface roughness (Ra) of 3 microns to 13 microns. In another embodiment, the textured surface 433 includes a surface roughness (Ra) of 3 microns to 12 microns. In another embodiment, the textured surface 433 includes a surface roughness (Ra) of 3 microns to 11 microns. In another embodiment, the textured surface 433 includes a surface roughness (Ra) of 3 microns to 10 microns. In another embodiment, the textured surface 433 includes a surface roughness (Ra) of 3 microns to 9 microns. In another embodiment, the textured surface 433 includes a surface roughness (Ra) of 3 microns to 8 microns. In another embodiment, the textured surface 433 includes a surface roughness (Ra) of 3 microns to 7 microns. In another embodiment, the textured surface 433 includes a surface roughness (Ra) of 3 microns to 6 microns. In another embodiment, the textured surface 433 includes a surface roughness (Ra) of 3 microns to 5 microns. In another embodiment, the textured surface 433 includes a surface roughness (Ra) of 3 microns to 4 microns.

In some embodiments, the textured surface 433 includes a surface roughness (Ra) of 4 microns to 15 microns. In another embodiment, the textured surface 433 includes a surface roughness (Ra) of 4 microns to 14 microns. In another embodiment, the textured surface 433 includes a surface roughness (Ra) of 4 microns to 13 microns. In another embodiment, the textured surface 433 includes a surface roughness (Ra) of 4 microns to 12 microns. In another embodiment, the textured surface 433 includes a surface roughness (Ra) of 4 microns to 11 microns. In another embodiment, the textured surface 433 includes a surface roughness (Ra) of 4 microns to 10 microns. In another embodiment, the textured surface 433 includes a surface roughness (Ra) of 4 microns to 9 microns. In another embodiment, the textured surface 433 includes a surface roughness (Ra) of 4 microns to 8 microns. In another embodiment, the textured surface 433 includes a surface roughness (Ra) of 4 microns to 7 microns. In another embodiment, the textured surface 433 includes a surface roughness (Ra) of 4 microns to 6 microns. In another embodiment, the textured surface 433 includes a surface roughness (Ra) of 4 microns to 5 microns.

In some embodiments, the textured surface 433 includes a surface roughness (Ra) of 5 microns to 15 microns. In another embodiment, the textured surface 433 includes a surface roughness (Ra) of 5 microns to 14 microns. In another embodiment, the textured surface 433 includes a surface roughness (Ra) of 5 microns to 13 microns. In another embodiment, the textured surface 433 includes a surface roughness (Ra) of 5 microns to 12 microns. In another embodiment, the textured surface 433 includes a surface roughness (Ra) of 5 microns to 11 microns. In another embodiment, the textured surface 433 includes a surface roughness (Ra) of 5 microns to 10 microns. In another embodiment, the textured surface 433 includes a surface roughness (Ra) of 5 microns to 9 microns. In another embodiment, the textured surface 433 includes a surface roughness (Ra) of 5 microns to 8 microns. In another embodiment, the textured surface 433 includes a surface roughness (Ra) of 5 microns to 7 microns. In another embodiment, the textured surface 433 includes a surface roughness (Ra) of 5 microns to 6 microns.

In some embodiments, the textured surface 433 includes a surface roughness (Ra) of 6 microns to 15 microns. In another embodiment, the textured surface 433 includes a surface roughness (Ra) of 6 microns to 14 microns. In another embodiment, the textured surface 433 includes a surface roughness (Ra) of 6 microns to 13 microns. In another embodiment, the textured surface 433 includes a surface roughness (Ra) of 6 microns to 12 microns. In another embodiment, the textured surface 433 includes a surface roughness (Ra) of 6 microns to 11 microns. In another embodiment, the textured surface 433 includes a surface roughness (Ra) of 6 microns to 10 microns. In another embodiment, the textured surface 433 includes a surface roughness (Ra) of 6 microns to 9 microns. In another embodiment, the textured surface 433 includes a surface roughness (Ra) of 6 microns to 8 microns. In another embodiment, the textured surface 433 includes a surface roughness (Ra) of 6 microns to 7 microns.

In some embodiments, the textured surface 433 includes a surface roughness (Ra) of 7 microns to 15 microns. In another embodiment, the textured surface 433 includes a surface roughness (Ra) of 7 microns to 14 microns. In another embodiment, the textured surface 433 includes a surface roughness (Ra) of 7 microns to 13 microns. In another embodiment, the textured surface 433 includes a surface roughness (Ra) of 7 microns to 12 microns. In another embodiment, the textured surface 433 includes a surface roughness (Ra) of 7 microns to 11 microns. In another embodiment, the textured surface 433 includes a surface roughness (Ra) of 7 microns to 10 microns. In another embodiment, the textured surface 433 includes a surface roughness (Ra) of 7 microns to 9 microns. In another embodiment, the textured surface 433 includes a surface roughness (Ra) of 7 microns to 8 microns.

In some embodiments, the textured surface 433 includes a surface roughness (Ra) of 8 microns to 15 microns. In another embodiment, the textured surface 433 includes a surface roughness (Ra) of 8 microns to 14 microns. In another embodiment, the textured surface 433 includes a surface roughness (Ra) of 8 microns to 13 microns. In another embodiment, the textured surface 433 includes a surface roughness (Ra) of 8 microns to 12 microns. In another embodiment, the textured surface 433 includes a surface roughness (Ra) of 8 microns to 11 microns. In another embodiment, the textured surface 433 includes a surface roughness (Ra) of 8 microns to 10 microns. In another embodiment, the textured surface 433 includes a surface roughness (Ra) of 8 microns to 9 microns.

In some embodiments, the textured surface 433 includes a surface roughness (Ra) of 9 microns to 15 microns. In another embodiment, the textured surface 433 includes a surface roughness (Ra) of 9 microns to 14 microns. In another embodiment, the textured surface 433 includes a surface roughness (Ra) of 9 microns to 13 microns. In another embodiment, the textured surface 433 includes a surface roughness (Ra) of 9 microns to 12 microns. In another embodiment, the textured surface 433 includes a surface roughness (Ra) of 9 microns to 11 microns. In another embodiment, the textured surface 433 includes a surface roughness (Ra) of 9 microns to 10 microns.

In some embodiments, the textured surface 433 includes a surface roughness (Ra) of 10 microns to 15 microns. In another embodiment, the textured surface 433 includes a surface roughness (Ra) of 10 microns to 14 microns. In another embodiment, the textured surface 433 includes a surface roughness (Ra) of 10 microns to 13 microns. In another embodiment, the textured surface 433 includes a surface roughness (Ra) of 10 microns to 12 microns. In another embodiment, the textured surface 433 includes a surface roughness (Ra) of 10 microns to 11 microns.

In some embodiments, the textured surface 433 includes a surface roughness (Ra) of 11 microns to 15 microns. In another embodiment, the textured surface 433 includes a surface roughness (Ra) of 11 microns to 14 microns. In another embodiment, the textured surface 433 includes a surface roughness (Ra) of 11 microns to 13 microns. In another embodiment, the textured surface 433 includes a surface roughness (Ra) of 11 microns to 12 microns.

In some embodiments, the textured surface 433 includes a surface roughness (Ra) of 12 microns to 15 microns. In another embodiment, the textured surface 433 includes a surface roughness (Ra) of 12 microns to 14 microns. In another embodiment, the textured surface 433 includes a surface roughness (Ra) of 12 microns to 13 microns. In some embodiments, the textured surface 433 includes a surface roughness (Ra) of 13 microns to 15 microns. In another embodiment, the textured surface 433 includes a surface roughness (Ra) of 13 microns to 14 microns. In some embodiments, the textured surface 433 includes a surface roughness (Ra) of 14 microns to 15 microns.

In some embodiments, the textured surface 433 includes a surface roughness (Ra) of 1 micron. In some embodiments, the textured surface 433 includes a surface roughness (Ra) of 2 microns. In some embodiments, the textured surface 433 includes a surface roughness (Ra) of 3 microns. In some embodiments, the textured surface 433 includes a surface roughness (Ra) of 4 microns. In some embodiments, the textured surface 433 includes a surface roughness (Ra) of 5 microns. In some embodiments, the textured surface 433 includes a surface roughness (Ra) of 6 microns. In some embodiments, the textured surface 433 includes a surface roughness (Ra) of 7 microns. In some embodiments, the textured surface 433 includes a surface roughness (Ra) of 8 microns. In some embodiments, the textured surface 433 includes a surface roughness (Ra) of 9 microns. In some embodiments, the textured surface 433 includes a surface roughness (Ra) of 10 microns. In some embodiments, the textured surface 433 includes a surface roughness (Ra) of 11 microns. In some embodiments, the textured surface 433 includes a surface roughness (Ra) of 12 microns. In some embodiments, the textured surface 433 includes a surface roughness (Ra) of 13 microns. In some embodiments, the textured surface 433 includes a surface roughness (Ra) of 14 microns. In some embodiments, the textured surface 433 includes a surface roughness (Ra) of 15 microns.

In some embodiments, a the first end 414 of the second photovoltaic shingle 412*b* overlays the side lap 425 of the first photovoltaic shingle 412*a*. In some embodiments, the head lap 422 of the first photovoltaic shingle 412*a* and the head lap 422 of the second photovoltaic shingle 412*b* form a seam 446 therebetween. In some embodiments, the textured surface 433 is configured to shed and inhibit water from entering the seam 446.

In another embodiment, the textured surface 433 of the side lap 425 includes a scrim. In some embodiments, the scrim is composed of a sheet of mesh material, such as, but not limited to, the mesh materials 575, 577 shown in FIGS. 12A and 12B. In some embodiments, the scrim includes fiberglass mesh. In some embodiments, the scrim includes a carbon fiber composite. In another embodiment, the scrim includes a polymer. In some embodiments, the scrim includes a textile material. In some embodiments, the scrim is laminated with the side lap 425. In another embodiment, the scrim is attached to the side lap 425 by an adhesive. In another embodiment, the scrim is thermally bonded to the side lap 425. In another embodiment, the scrim is located on a second surface opposite the textured surface 433. In some embodiments, the scrim is configured to prevent water from wicking between overlapping and/or adjacent ones of the roofing shingles 412. In another embodiment, the head lap 422 includes a scrim located on a surface thereof.

It should be understood that the embodiments described herein are merely exemplary and that a person skilled in the art may make many variations and modifications without departing from the spirit and scope of the invention. All such variations and modifications are intended to be included within the scope of the invention.

What is claimed is:

1. A system, comprising:
 a plurality of roofing shingles installed on a roof deck,
  wherein each of the plurality of roofing shingles includes
   a first end, a second end opposite the first end, a first edge extending from the first end to the second end, and a second edge opposite the first edge and extending from the first end to the second end,
   a head lap extending from a first location between the first end and the second end to a second location between the first end and the second end, and extending from the first edge to a third location between the first edge and the second edge,
   a reveal portion extending from the first location to the second location and from the second edge to the third location,
   a first side lap,
    wherein the first side lap extends from the first end to the first location and from the first edge to the second edge, and
   a second side lap,
    wherein the second side lap extends from the second end to the second location and from the first edge to the second edge,
    wherein the first side lap includes a first surface,
    wherein the first surface includes an adhesive, and
   wherein the second side lap of a first one of the plurality of roofing shingles overlays and is attached to the first side lap of a second one of the plurality of roofing shingles to form a sealed portion between the head lap of the first one of the plurality of roofing shingles and the head lap of the second one of the plurality of roofing shingles.

2. The system of claim 1, wherein the adhesive includes caulking.

3. The system of claim 1, wherein the adhesive includes at least one adhesive strip.

4. The system of claim 3, wherein the at least one adhesive strip is an adhesive tape.

5. The system of claim 4, wherein the adhesive tape is butyl tape.

6. The system of claim 3, wherein the at least one adhesive strip is a peel and stick film sheet.

7. The system of claim 1, wherein the reveal portion includes at least one solar cell.

8. The system of claim 1, wherein the head lap of each of the plurality of roofing shingles includes a plurality of grooves, each of which extends from a first end thereof, located proximate to the first edge and between the first end of a corresponding one of the plurality of roofing shingles and the second end of the corresponding one of the plurality of roofing shingles, to a second end thereof, located proximate to the first location, and wherein the head lap of the first one of the plurality of roofing shingles and the head lap of the second one of the plurality of roofing shingles form a seam therebetween, and wherein a longitudinal axis of each of the plurality of grooves does not intersect the seam.

9. The system of claim 8, wherein each of the plurality of grooves extends 0 degrees to 45 degrees relative to the seam.

10. The system of claim 1, wherein the second side lap includes a first end and a second end opposite the first end of the second side lap, a first edge extending from the first end of the second side lap to the second end of the second side lap, a second edge opposite the first edge of the second side lap and extending from the first end of the second side lap to the second end of the second side lap, and a plurality of grooves, and wherein the head lap of the first one of the plurality of roofing shingles and the head lap of the second one of the plurality of roofing shingles form a seam therebetween, and wherein a longitudinal axis of each of the plurality of grooves does not intersect the seam.

11. The system of claim 10, wherein each of the plurality of grooves extends 0 degrees to 45 degrees relative to the seam.

12. A method, comprising:
obtaining a plurality of roofing shingles, each of the plurality of roofing shingles includes
a first end, a second end opposite the first end, a first edge extending from the first end to the second end, and a second edge opposite the first edge and extending from the first end to the second end,
a head lap extending from a first location between the first end and the second end to a second location between the first end and the second end, and extending from the first edge to a third location between the first edge and the second edge,
a reveal portion extending from the first location to the second location and from the second edge to the third location,
a first side lap,
wherein the first side lap extends from the first end to the first location and from the first edge to the second edge, and
a second side lap,
wherein the second side lap extends from the second end to the second location and from the first edge to the second edge,
wherein the first side lap includes a first surface and an adhesive on the first surface;
installing a first one of the plurality of roofing shingles on a roof deck; and
installing a second one of the plurality of roofing shingles on the roof deck,
wherein the second side lap of the second one of the plurality of roofing shingles overlays and is attached to the first side lap of the first one of the plurality of roofing shingles to form a sealed portion between the head lap of the first one of the plurality of roofing shingles and the head lap of the second one of the plurality of roofing shingles.

13. The method of claim 12, wherein the adhesive includes caulking.

14. The method of claim 12, wherein the adhesive includes at least one adhesive strip.

15. The method of claim 14, wherein the at least one adhesive strip is an adhesive tape.

16. The method of claim 15, wherein the adhesive tape is butyl tape.

17. The method of claim 14, wherein the at least one adhesive strip is a peel and stick film sheet.

18. The method of claim 12, wherein the reveal portion includes at least one solar cell.

19. A system, comprising:
a plurality of roofing shingles installed on a roof deck,
wherein each of the plurality of roofing shingles includes
a first end, a second end opposite the first end, a first edge extending from the first end to the second end, and a second edge opposite the first edge and extending from the first end to the second end,
a head lap extending from a first location between the first end and the second end to a second location between the first end and the second end, and extending from the first edge to a third location between the first edge and the second edge,
wherein the head lap of each of the plurality of roofing shingles includes a plurality of grooves, each of which extends from a first end thereof, located proximate to the first edge and between the first end of a corresponding one of the plurality of roofing shingles and the second end of the corresponding one of the plurality of roofing shingles, to a second end thereof, located proximate to the first location,
a reveal portion extending from the first location to the second location and from the second edge to the third location,
wherein the reveal portion includes a first width,
wherein each of the plurality of grooves includes a second width,
wherein the second width is 10% to 100% of the first width,
a first side lap at the first end, and
a second side lap at the second end,
wherein the first side lap includes a first surface,
wherein the first surface includes an adhesive, and
wherein the second side lap of a first one of the plurality of roofing shingles overlays and is attached to the first side lap of a second one of the plurality of roofing shingles to form a sealed portion between the head lap of the first one of the plurality of roofing shingles and the head lap of the second one of the plurality of roofing shingles,
wherein the head lap of the first one of the plurality of roofing shingles and the head lap of the second one of the plurality of roofing shingles form a seam therebetween, and
wherein a longitudinal axis of each of the plurality of grooves does not intersect the seam.

20. A system, comprising:
a plurality of roofing shingles installed on a roof deck,
wherein each of the plurality of roofing shingles includes
a first end, a second end opposite the first end, a first edge extending from the first end to the second end, and a second edge opposite the first edge and extending from the first end to the second end,
a head lap extending from a first location between the first end and the second end to a second location between the first end and the second end, and extending from the first edge to a third location between the first edge and the second edge,
wherein the head lap of each of the plurality of roofing shingles includes a plurality of grooves, each of which extends from a first end thereof, located proximate to the first edge and between the first end of a corresponding one of the plurality of roofing shingles and the second end of the corresponding one of the plurality of roofing shingles, to a second end thereof, located proximate to the first location,
a reveal portion extending from the first location to the second location and from the second edge to the third location,
wherein the reveal portion includes a first width,
wherein each of the plurality of grooves includes a second width,
wherein the second width is 10% to 100% of the first width,
a first side lap at the first end, and
a second side lap at the second end,
wherein the first side lap includes a first surface,
wherein the first surface includes an adhesive, and
wherein the second side lap of a first one of the plurality of roofing shingles overlays and is attached to the first side lap of a second one of the plurality of roofing shingles to form a sealed portion between the head lap of the first one of the plurality of roofing shingles and the head lap of the second one of the plurality of roofing shingles,
wherein the head lap of the first one of the plurality of roofing shingles and the head lap of the second one of the plurality of roofing shingles form a seam therebetween, and
wherein a longitudinal axis of each of the plurality of grooves does not intersect the seam.

\* \* \* \* \*